(12) United States Patent
Kim et al.

(10) Patent No.: US 10,984,508 B2
(45) Date of Patent: Apr. 20, 2021

(54) DEMONSTRATION DEVICES AND METHODS FOR ENHANCEMENT FOR LOW VISION USERS AND SYSTEMS IMPROVEMENTS

(71) Applicant: EYEDAPTIC INC., Laguna Niguel, CA (US)

(72) Inventors: Brian Kim, San Clemente, CA (US); David Watola, Irvine, CA (US); Jay E Cormier, Laguna Niguel, CA (US)

(73) Assignee: EYEDAPTIC, INC., Laguna Niguel, CA (US)

( * ) Notice: Subject to any disclaimer, the term of this patent is extended or adjusted under 35 U.S.C. 154(b) by 144 days.

(21) Appl. No.: 16/177,333

(22) Filed: Oct. 31, 2018

(65) Prior Publication Data

US 2019/0180421 A1 Jun. 13, 2019

Related U.S. Application Data

(60) Provisional application No. 62/579,657, filed on Oct. 31, 2017, provisional application No. 62/579,798, filed on Oct. 31, 2017.

(51) Int. Cl.
*G06T 5/00* (2006.01)
*G06T 5/10* (2006.01)
(Continued)

(52) U.S. Cl.
CPC .............. *G06T 5/004* (2013.01); *G06T 5/007* (2013.01); *G06T 5/008* (2013.01); *G06T 5/10* (2013.01);
(Continued)

(58) Field of Classification Search
CPC ......... G06T 5/004; G06T 5/007; G06T 5/008; G06T 5/10; G06T 11/60; G06T 15/00;
(Continued)

(56) References Cited

U.S. PATENT DOCUMENTS 5,546,099 A 8/1996 Quint et al.
5,777,715 A 7/1998 Kruegle et al.
(Continued)

FOREIGN PATENT DOCUMENTS

CA 2916780 A1 10/2008
CA 164180 S 9/2016
(Continued)

OTHER PUBLICATIONS

Carroll et al.; Visual field testing:from one medical student to another; 18 pages; retrieved from the internet (http://eyerounds.org/tutorials/VF-testing/); Aug. 22, 2013.
(Continued)

*Primary Examiner* — Ali Bayat
(74) *Attorney, Agent, or Firm* — Shay Glenn LLP

(57) ABSTRACT

A visual aid provides utility to its users by performing geometric transformations of raw images from a digital camera into processed images for electronic display, via three nested levels of "implementation" namely, the nature of the mapping that will be applied, i.e. specifying a specific mapping or parameterized family of mappings; the algorithm set used to effect the select mapping, independent of the processor upon which it executes; and the method for realizing this algorithm on that processor. Likewise offered for consideration are software feature sets tied to user interface which enable dynamic tuning of the subject visual context and environments for low vision users, Inter Alia.

18 Claims, 13 Drawing Sheets

(51) Int. Cl.
  *H04N 5/232* (2006.01)
  *G06T 11/60* (2006.01)
  *G06T 15/00* (2011.01)

(52) U.S. Cl.
  CPC .............. *G06T 11/60* (2013.01); *G06T 15/00* (2013.01); *H04N 5/23254* (2013.01); *H04N 5/23267* (2013.01); *G06T 2207/10024* (2013.01); *G06T 2207/20221* (2013.01)

(58) Field of Classification Search
  CPC ........... G06T 2207/10024; G06T 2207/20221; H04N 5/2354; H04N 5/23267
  USPC ........................................................ 382/274
  See application file for complete search history.

(56) References Cited

U.S. PATENT DOCUMENTS

| | | | |
|---|---|---|---|
| 5,892,570 A | 4/1999 | Stevens | |
| 8,384,999 B1* | 2/2013 | Crosby | G02B 27/0172 359/631 |
| 8,976,086 B2 | 3/2015 | Hilkes | |
| 9,516,283 B2 | 12/2016 | Hilkes et al. | |
| 9,782,084 B2 | 10/2017 | Maertz | |
| 10,073,516 B2* | 9/2018 | Larsen | G06F 3/013 |
| 10,429,675 B2 | 10/2019 | Greget | |
| 10,564,714 B2 | 2/2020 | Marggraff et al. | |
| 2007/0200927 A1 | 8/2007 | Krenik | |
| 2008/0013047 A1 | 1/2008 | Todd et al. | |
| 2008/0247620 A1 | 10/2008 | Lewis et al. | |
| 2008/0309878 A1 | 12/2008 | Hirji | |
| 2011/0043644 A1 | 2/2011 | Munger et al. | |
| 2011/0109876 A1 | 5/2011 | Reichow et al. | |
| 2011/0181692 A1 | 7/2011 | Kuno | |
| 2011/0285960 A1 | 11/2011 | Kohn et al. | |
| 2012/0206452 A1 | 8/2012 | Geisner et al. | |
| 2012/0242865 A1 | 9/2012 | Vartanian et al. | |
| 2012/0309529 A1 | 12/2012 | Westlund et al. | |
| 2013/0215147 A1 | 8/2013 | Hilkes et al. | |
| 2014/0063062 A1 | 3/2014 | Fateh | |
| 2014/0210970 A1 | 7/2014 | Dalal et al. | |
| 2015/0002808 A1 | 1/2015 | Rizzo, III et al. | |
| 2015/0355481 A1 | 12/2015 | Hilkes et al. | |
| 2016/0033771 A1 | 2/2016 | Tremblay et al. | |
| 2016/0041615 A1 | 2/2016 | Ikeda | |
| 2016/0085302 A1 | 3/2016 | Publicover et al. | |
| 2016/0116979 A1* | 4/2016 | Border | G06K 9/222 345/156 |
| 2016/0156850 A1 | 6/2016 | Werblin et al. | |
| 2016/0171779 A1 | 6/2016 | Bar-Zeev et al. | |
| 2016/0178912 A1 | 6/2016 | Kusuda et al. | |
| 2016/0187969 A1 | 6/2016 | Larsen et al. | |
| 2016/0216515 A1* | 7/2016 | Bouchier | G06T 19/006 |
| 2016/0235291 A1 | 8/2016 | Goh et al. | |
| 2016/0264051 A1 | 9/2016 | Werblin | |
| 2016/0270648 A1 | 9/2016 | Freeman et al. | |
| 2016/0270656 A1* | 9/2016 | Samec | A61B 3/1216 |
| 2016/0314564 A1 | 10/2016 | Jones et al. | |
| 2016/0349509 A1 | 12/2016 | Lanier et al. | |
| 2017/0185723 A1 | 6/2017 | McCallum et al. | |
| 2017/0200296 A1 | 7/2017 | Jones et al. | |
| 2017/0221264 A1* | 8/2017 | Perry | G06F 3/011 |
| 2017/0249862 A1 | 8/2017 | Border | |
| 2017/0273552 A1 | 9/2017 | Leung et al. | |
| 2018/0104106 A1 | 4/2018 | Lee et al. | |
| 2018/0144554 A1 | 5/2018 | Watola et al. | |
| 2018/0203231 A1 | 7/2018 | Glik et al. | |
| 2018/0249151 A1 | 8/2018 | Freeman et al. | |
| 2018/0365877 A1 | 12/2018 | Watola et al. | |
| 2019/0012841 A1 | 1/2019 | Kim et al. | |
| 2019/0279407 A1* | 9/2019 | McHugh | G06F 3/04842 |
| 2019/0281211 A1 | 9/2019 | Watola et al. | |
| 2019/0331920 A1 | 10/2019 | Watola et al. | |
| 2019/0339528 A1 | 11/2019 | Freeman et al. | |
| 2019/0385342 A1 | 12/2019 | Freeman et al. | |
| 2021/0022599 A1 | 1/2021 | Freeman et al. | |

FOREIGN PATENT DOCUMENTS

| | | |
|---|---|---|
| EP | 2674805 A2 | 12/2013 |
| WO | WO2008/119187 A1 | 10/2008 |
| WO | WO2011/060525 A1 | 5/2011 |
| WO | WO2013/120180 A1 | 8/2013 |
| WO | WO2013/177654 A1 | 12/2013 |
| WO | WO2014/107261 A1 | 7/2014 |
| WO | WO2016/036860 A1 | 3/2016 |
| WO | WO2016/077343 A1 | 5/2016 |
| WO | WO2016/144419 A1 | 9/2016 |
| WO | WO2016/149536 A1 | 9/2016 |
| WO | WO2016/168913 A1 | 10/2016 |
| WO | WO2017/059522 A1 | 4/2017 |
| WO | WO2018/200717 A1 | 11/2018 |
| WO | WO2019/232082 A1 | 12/2019 |
| WO | WO2020/014705 A1 | 1/2020 |
| WO | WO2020/014707 A1 | 1/2020 |
| WO | WO2020/068819 A1 | 4/2020 |
| WO | WO2021/003406 A1 | 1/2021 |

OTHER PUBLICATIONS

Unser et al.; B-spline signal processing: Part II—efficient design and applicationtions; IEEE Transactions on Signal Processing; 41(2); pp. 834-848; Feb. 1993.

Unser et al.; B-spline signal processing: part I-theory; IEEE Transactions on Signal Processing; 41(2)); pp. 821-832; Feb. 1993.

Unser et al.; TheL2 polynomial spline pyramid; IEEE Transactions on Pattern Analysis and Machine Intelligence; 15(4); pp. 364-379; Apr. 1993.

Unser; Splines—a perfect fit for signal and image processing; IEEE Signal Processing Magazine; 16 (Article); pp. 22-38; Nov. 1999.

Kim et al.; U.S. Appl. No. 16/727,564 entitled "Artificial intelligence enhanced system for adaptive control driven ar/vr visual aids," filed Dec. 26, 2019.

Watola et al.; U.S. Appl. No. 16/789,237 entitled "Systems for augmentd reality visual aids and tools," filed Feb. 12, 2020.

Gonzalez; Advanced Imaging in Head-Mounted Displays for Patients with Age-Related Macular Degeneration; Doctoral dissertation; Technical University of Munich; p. 1-129; (year of pub. sufficiently earlier than effective US filing date and any foreign priority date) 2011.

\* cited by examiner

Four score and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we shou do this.

FIG. 4

Four score and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we shou do this.

FIG. 6

Four score and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we shou do this.

FIG. 7

Four score and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we should do this.

FIG. 8

DEMONSTRATION DEVICES AND METHODS FOR ENHANCEMENT FOR LOW VISION USERS AND SYSTEMS IMPROVEMENTS

CROSS-REFERENCE TO RELATED APPLICATIONS

This filing claims full Paris Convention Rights and the Express Priority benefit of each of U.S. Prov. Application Ser. Nos. 62/579,657 and 62/579,798 filed Oct. 31, 2017.

This document expressly incorporates each commonly owned piece of intellectual property, namely U.S. Provisional Ser. Nos. 62/530,792 filed Jul. 10, 2017, 62/530,286, filed Jul. 9, 2017 and 62/470,297, filed Mar. 12, 2017, 62/579,657, filed Oct. 31, 2017, 62/579,798, filed Oct. 31, 2017, PCT/US17/62421, filed Nov. 17, 2017, Ser. No. 15/817,117, filed Nov. 17, 2017, 62/639,347, filed Mar. 6, 2018, Ser. No. 15/918,884, filed Mar. 12, 2018, 62/677,463, filed May 29, 2018, Ser. No. 16/030,788, filed Jul. 9, 2018, 62/735,643, filed Sep. 24, 2018; likewise all US and other Letters Patent mentioned herein are expressly incorporated by reference as if expressly set forth herein, including all data in the appendix, of each respective filing.

The present disclosures relate to the fields of vision enhancement, software and tools driving the same, and artificial intelligence and/or clockwork-orange style of chimeric systems of mixed organic and synthetic constituents inside of structural and infrastructural domains and structures not constrained or classified by traditional definitions, per se, or disruptive technologies, based in part on human visual and cognitive functionalities often manifested by improved optics and understanding of visual perceptions and anomalies. Additionally, the Present Inventions include demonstration devices and processes to improve the low vision and other user's perspective.

BACKGROUND OF THE DISCLOSURES

People who suffer from low vision—particularly individuals with central visual field deficiencies like those accompanying Age-related Macular Degeneration (AMD)—are better able to perform visual tasks when presented with higher-contrast scenes than with lower-contrast scenes. Heightened contrast is especially desirable when reading, where ambient lighting degrades performance even with black ink on uncluttered white background media. Visual aids, such as wearable glasses that show electronically-processed images from a digital camera or other media source, can assist by artificially increasing the visible contrast in the images that they display.

A large body of theoretical knowledge and practical technique is available for improving contrast in digital images, and many of the published methods are extremely effective. However, the overwhelming majority are unsuitable for use in wearable mobile battery-operated devices with real-time performance requirements but relatively limited computing capabilities.

OBJECTS AND SUMMARY OF THE INVENTION

Briefly stated, a visual aid provides utility to its users by performing geometric transformations of raw images from a digital camera into processed images for electronic display, via three nested levels of "implementation" namely, the nature of the mapping that will be applied, i.e. specifying a specific mapping or parameterized family of mappings; the algorithm set used to effect the select mapping, independent of the processor upon which it executes; and the method for realizing this algorithm on that processor. Likewise offered for consideration are software feature sets tied to user interface which enable dynamic tuning of the subject visual context and environments for low vision users, Inter Alia.

According to the present invention, there are taught Visual aids that show electronically-processed images from a digital camera or other media source, which support low-vision users by artificially increasing the visible contrast in the images that they display.

Heightened contrast is especially desirable when reading, where ambient lighting degrades performance even with black ink on uncluttered white background media. Visual aids which are offered for consideration herein show electronically-processed images from a digital camera or other media source, which support low-vision users by artificially increasing the visible contrast in the images that they display.

A large body of theoretical knowledge and practical technique is available for improving contrast in digital images, and many of the published methods are extremely effective. However, the overwhelming majority are unsuitable for use in wearable mobile battery-operated devices with real-time performance requirements but relatively limited computing capabilities. One well-known technique called unsharp masking (USM) is ubiquitous in graphical image processing software (e.g. the popular Adobe Photoshop product line) as a tool for increasing sharpness and contrast in digital images. Unsharp masking has its origins in photographic film processing; as the digital simulation of a simple but venerable analog processing technique it retains the advantage of low computational complexity. Modern USM enhances fine details—sharpness—by emphasizing transitions, subsequently providing an appearance of higher contrast across those transitions. Unfortunately, low-vision users generally lack sufficient visual acuity to recognize or appreciate these fine-structured changes, which to some extent rely on psycho-visual phenomena more than an objectively measurable increase in contrast.

This invention demonstrates how the basic framework of USM can be adjusted to support the distinctive needs of low-vision users for reading and other visual tasks. There have been a number of published attempts to generalize USM in recent years; the innovations presented here remain compatible with those efforts and can still be enjoyed by fully-sighted users, but are motivated by the needs of the low-vision community and consequently require changes that run counter to common USM usage and methodology.

Image stabilization for video captured using digital cameras is used to reduce apparent motions in the resulting video that are due to undesired camera movements typically resulting from an insufficiently-secured camera mount. Often, this "camera shake" is associated with a handheld camera but even a sturdy fixture can allow undesired movement, as in a security camera exposed to high winds. Some cameras as are exposed to a mixture of deliberate and undesired motion, as in a forward-facing vehicle-borne dashboard camera that is subjected to vibration during normal travel. It is desirable to eliminate the appearance of such motion from captured video to achieve higher-quality, more intelligible, images.

Methods for achieving stabilization fall broadly into two categories, optical image stabilization (OIS) and electronic image stabilization (EIS). OIS works by manipulating an optical path—physically moving a lens, sensor, or other physical component(s) in an image capture system such that sufficiently-small sudden movements are reduced or smoothed. OIS predates the advent of cheap digital cameras, and includes large passive rigs possessing large moments of inertia so that large or fast motions are dampened. More commonly, OIS implementations are complex active systems comprising gyroscopes and gimbals to keep a camera on target in spite of platform motion. Because physical objects must be moved, OIS applications tend to be used to compensate for relatively small motions.

For example, many modern DSLR cameras feature vibration reduction using active OIS to move individual elements inside of detachable lenses or to move the CMOS image sensor within the camera body.

EIS, on the other hand, does not attempt to move any physical element in order to counter a detected movement. Instead, the amount and orientation of physical motions affecting the camera are measured and the captured image is processed and manipulated in such a way as to restore the image, simulating its capture from a viewpoint that lacks the suppressed movement. The requisite geometric processing to achieve this effect has long been well-known in the computer vision and 3D-graphics community, but the basic scheme has been revolutionized by the development of inexpensive microelectromechanical (MEMS) sensors for acceleration and rotation. Today, nearly every handheld mobile device with a digital camera also possesses MEMS accelerometers to measure linear motion (translation) and/or MEMS gyroscopes to measure rotation. Embedded operating systems, notably the popular Android, have integrated support for these devices and provide software interfaces to their measurements. As a result, real-time and post-processed electronic image stabilization has become a ubiquitous commodity.

Using low-cost EIS does bring some disadvantages and challenges. Geometric processing of captured images simulates changing the field of view of the camera without actually re-pointing any optics. A portion of the captured image must therefore be lost: to avoid visually-jarring cropping artifacts, some amount of border, dependent on the greatest amount of motion that must be compensated, is sacrificed on each side of the rectangular image. Though some manufacturers add extra pixels to their sensors to maintain the same image resolution after truncation, EIS invariably reduces the available field of view of the camera sensor. More significantly, the performance of MEMS sensors, particularly gyroscopes, greatly limits the degree of stabilization possible.

This invention demonstrates how EIS can be employed in an electronic visual aid device primarily intended for low-vision users. Such visual aids are constructed from the same class of commodity hardware and software found in commonly-used mobile platforms (e.g. phones and tablets) but are worn like eyeglasses. They display electronically-manipulated images captured via a co-located digital camera directly to the wearer. This head-mounted configuration places particular and stringent requirements on an image stabilization system that are not commonly seen in mundane applications, and requires changes to overcome the limitations presented by commodity hardware and software. The innovations detailed herein describe how to meet these challenges and deliver viable, practical EIS to all wearers of head-mounted electronic visual aids, with additional features beneficial to low-vision users as well.

Image stabilization for video captured using digital cameras is used to reduce apparent motions in the resulting video that are due to undesired camera movements typically resulting from an insufficiently-secured camera mount. Often, this "camera shake" is associated with a handheld camera but even a sturdy fixture can allow undesired movement, as in a security camera exposed to high winds. Some cameras as are exposed to a mixture of deliberate and undesired motion, as in a forward-facing vehicle-borne dashboard camera that is subjected to vibration during normal travel. It is desirable to eliminate the appearance of such motion from captured video to achieve higher-quality, more intelligible images.

This invention demonstrates how EIS can be employed in an electronic visual aid device primarily intended for low-vision users. Such visual aids are constructed from the same class of commodity hardware and software found in commonly-used mobile platforms (e.g. phones and tablets) but are worn like eyeglasses. They display electronically-manipulated images captured via a co-located digital camera directly to the wearer. This head-mounted configuration places particular and stringent requirements on an image stabilization system that are not commonly seen in mundane applications, and requires changes to overcome the limitations presented by commodity hardware and software. The innovations detailed herein describe how to meet these challenges and deliver viable, practical EIS to all wearers of head-mounted electronic visual aids, with additional features beneficial to low-vision users as well.

BRIEF DESCRIPTION OF THE DRAWINGS

Various preferred embodiments are described herein with references to the drawings in which merely illustrative views are offered for consideration, whereby:

FIG. 4 is an example of a low-contrast camera text image captured under typical lighting conditions;

FIG. 6 is the image from FIG. 4 after processing with USM and g=10.0.;

FIG. 7 is an image of text after processing with USM and g=−10.0;

FIG. 8 is the image from FIG. 7 after binarization by applying thresholding and inversion;

FIG. 9 (B) is a high-level block diagram showing major components, processes, dataflow and interactions in an Electronic Image Stabilization implementation suitable for low-vision users in a wearable electronic visual aid device;

Figure 1:
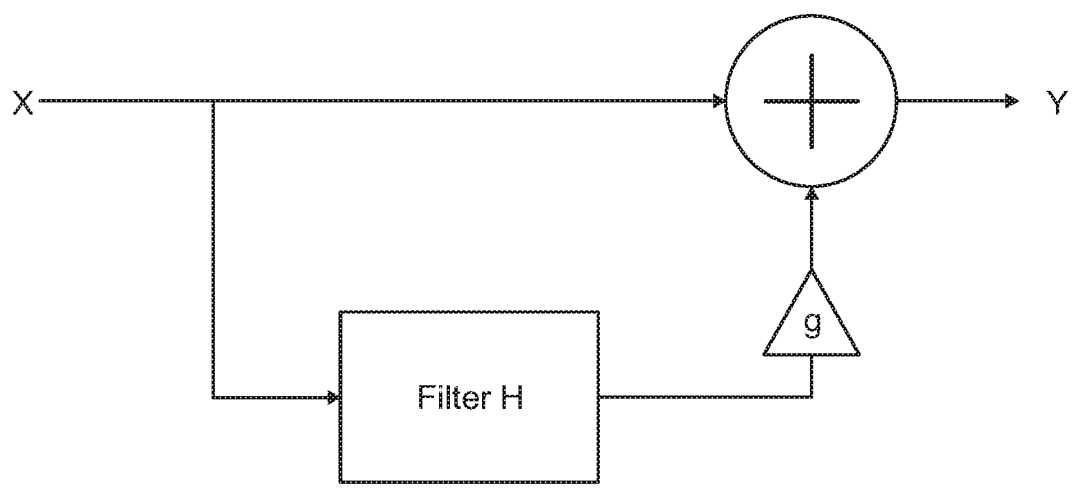
FIG. 1 is a block diagram depicting the standard Unsharp Masking operation.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTIONS

The present inventors have developed software which functions with any available and future developed hardware for low vision users with a few basic commonalities, as described above and claimed below. In order to show uniquity of the instant systems, an app is available (from EYEDAPTIC® of Laguna Beach, Calif.) with various aspects of the present inventions able to be used with any smart tablet, iPad® or portable electronic devices.

The Prior Art is offered for consideration only to show limitations of the extant world.

In contrast, note that the submitted background material for the Eyedaptic device devotes considerable space to development of the mapping methodology as the embodiment of a mathematical function. For didactic purposes, the mathematical model is painstakingly presented in stages moving from abstract to concrete and simple to complex. At all times, an underlying paradigm is respected—even in going to implementation, the assumption remains of a monolithic entity that drives the processing. Whereas, others such as, for example, Visionize discriminates between "Inside the bubble" and "outside the bubble" in, order to apply a disparate set of steps, the Eyedaptic process (at implementation level 2) requires no decision: it steadfastly computes a mapping and dutifully applies uniform processing. There is an immense philosophical gulf between these approaches which transcends its simplistic summary: in one case, the "bubble" is a central feature around which device functionality is organized; in the other, the appearance of a "bubble" is simply an aspect of emergent behavior elicited by tuning the mathematical model corresponding to the locus of the central visual field.

The uniform treatment of all locations, not just central vs. non-central pixels, aligns with other philosophically-driven implementation decisions, notably the decomposition of processing into pipeline stages that can be reconfigured, re-ordered, and reconnected at any time. Here is further stark contrast with the Visionize approach, where the flowchart indicates that the divergent code paths apply their specific processing in-line before re-converging. (This is, of course, a fairly straightforward and well-understood implementation strategy). This difference has important implications beyond mere philosophy or the didactic benefits accompanying increased abstraction, however. When executed on a modern processor (whether CPU or GPU), decision branches that accompany if/then/else constructs in a flowchart are relatively inefficient—uniformity of computation across all pixels in a GPU is universally preferred due to enforcement of a SIMT (Single Instruction, Multiple Thread) parallel computation model. Maintaining uniform treatment of all pixels is neither as restrictive nor complicated as it might sound, as there are well-known techniques (widely embraced within the high-performance CPU and GPU communities) for obtaining the effects of location-based discrimination without resorting to explicit decisions, CPU/GPU branching instructions, or divergent/alternate code paths.

By way of example, for the Visionize patent, it appears that implementation levels 2 and 3 are identical. This approach is straightforward and consistent with conventional modern implementation methodology—the product uses a mobile phone, which presents a GPU and an industry-standard OpenGL programming interface for directly mapping an algorithm (such as the one in their flowchart) into source code that will faithfully implement the semantics it encodes. When distilled to its core functionality—coordinate transformations only—an efficient OpenGL realization might look like Listing 1, below:

```
/* LISTING 1 */
varying vec2 outputPixelCoord ;
uniform sampler2D cameraImageTexture ;
uniform float zoomRadius ;
uniform float magnification ;
const float aspectRatio = 1280.0/720.0 ;
void main( ) {
    vec2 scaledCoord = vec2((2.0*outputPixelCoord.x-1.0)
*aspectRatio,
(2.0*outputPixelCoord.y-1.0)) ;
    float radius = length(scaledCoord)
    float angle = atan(scaledCoord.y, scaledCoord.x) ;
    if (radius<zoomRadius) {
        float newRadius = zoomRadius/magnification ;
        vec2 sourceCoord = vec2(0.5*(newRadius*cos(angle)/
aspectRatio+1.0),
0.5*(newRadius*sin(angle)+1.0)) ;
        gl_FragColor = texture2D(cameraImageTexture, sourceCoord) ;
    } else {
        gl_FragColor = texture2D(cameraImageTexture,
outputPixelCoord) ;
    }
}
```

This OpenGL code is a fragment shader that will be executed once for every pixel in the output image. For each such iteration, it is given as inputs the camera image (cameraImageTexture) and the coordinates (outputPixelCoord) within the final output image for which an output pixel color must be determined (gl_FragColor). Two additional parameters specify the radius of a central region wherein magnification will be applied (zoomRadius) and the amount of that magnification (magnification). The constant horizontal-to-vertical screen aspect ratio must also be known (aspectRatio, e.g. 1280.0/720.0 for this example).

Note that for every pixel, OpenGL code in Listing 1 must compute transcendental functions: the built-in function length( ) internally requires a square root, and a tan( ) will be approximated by a convergent series. Depending on the pixel location, this shader will either invoke more transcendental functions to determine zoomed source pixel location within the camera image (sourceCoord) or it will simply use the unmodified outputPixelCoord. The presence of the conditional (if) statement within this shader allows it to realize the desired pixel remapping while slavishly following the recipe provided by its flowchart, but the existence of parallel code paths disrupts orderly parallel execution on any SIMT GPU architecture. A small change to the code eliminates this source of inefficiency, resulting in Listing 2, below:

```
/* LISTING 2 */
varying vec2 outputPixelCoord ;
uniform sampler2D cameraImageTexture ;
uniform float zoomRadius ;
uniform float magnification ;
const float aspectRatio = 1280.0/720.0 ;
void main( ) {
    vec2 scaledCoord = vec2((2.0*outputPixelCoord.x-1.0)*aspectRatio,
(2.0*outputPixelCoord.y-1.0)) ;
    float radius = length(scaledCoord) ;
    float angle = atan(scaledCoord.y, scaledCoord.x) ;
    float newRadius = mappingFunction1D(radius, zoomRadius,
magnification) ;
    vec2 sourceCoord = vec2(0.5*(newRadius*cos(angle)/aspectRatio+1.0),
0.5*(newRadius*sin(angle)+1.0)) ;
    gl_FragColor = texture2D(cameraImageTexture, sourceCoord) ;
}
```

Now, there is no decision or branch. Instead, a new sourceCoord is computed whether the current output pixel is centrally or peripherally located. The mapping, which will either return a scaled (zoomed) or unchanged newRadius depending on the computed input radius, is entirely abstracted into a single function called mappingFunction1D. That function is not presented here, but it is straightforward to express it without recourse to branching or decisions; the resulting object code will be automatically inserted in line with the main computation by the OpenGL compiler for a branch-free final product. There is a cost to this change—more computations occur—but it is not a priori certain whether a net acceleration or slowdown will result since elimination of alternate execution paths also prevents SIMT branching stalls. Such a minor source-level change already diverges sufficiently from the original Listing 1 to demonstrate that implementation levels 2 and 3 (described above) can be separated. However, still more dramatic possibilities exist.

Both fragment shaders presented above perform a large number of mathematical computations for each frame. This is normal, and is in fact the very purpose for which GPUs exist. Evolution of modern OpenGL and GPU methodology was driven largely by the gaming industries, which require tremendous computing power to render detailed 3D environments at high resolutions, high frame rates, and low latencies. In comparison, the hardware requirements for transferring a single texture such as a camera image onto a 2D rectangular display are meager, even when multiple trigonometric and transcendental functions must be evaluated per pixel. The code in Listing 1 functions in real-time without issues on an embedded GPU, with plenty of available computational margin in spite of having a small fraction of the resources of a discrete gaming GPU (typically 16-32 streaming processors vs. thousands on the desktop).

Although these complex calculations are required to realize the desired transformation, it is not necessary to perform them for every iterated pixel or frame—their results are deterministic and invariant for any specific output pixel except when either zoomRadius or magnification changes. This suggests that a lookup table can be maintained, as in Listing 3 below (where it manifests as a second texture, mappingTexture, having the same dimensions as the desired output image):

```
/* LISTING 3 */
varying vec2 outputPixelCoord ;
uniform sampler2D cameraImageTexture ;
uniform sampler2D mappingTexture ;
void main( ) {
    vec2 sourceCoord = texture2D(mappingTexture,
    outputPixelCoord) .xy ;
    gl_FragColor = texture2D(cameraImageTexture, sourceCoord) ;
}
```

During production of each output pixel of each frame, there are no longer any mathematical operations performed by the shader. In fact, the only remaining operations are a pair of two-dimensional texture interpolations. Furthermore, GPU hardware can optimize the first texture lookup because it will always occur on exact pixel coordinates (not requiring any interpolation), and also potentially because, of its structured non-random pattern of access to mappingTexture. Computations only need be performed to update mappingTexture (using the CPU, or the GPU with additional OpenGL) relatively infrequently.

Although this seems like an obvious implementation technique, it is in fact not commonly used when writing GPU shaders. This is because GPUs provide extremely high throughput when performing streaming computations, due to both high-speed calculation hardware and integrated SIMT parallelism; conversely, their performance suffers dramatically when accessing memory due to relatively high latencies and the unavoidable physical requirement to serialize access to randomly scattered addresses. In high-performance gaming and graphics applications, modern programmers learn to eschew latency and instead leverage the computational capabilities of their GPUs. The latest OpenGL ES standard, intended for smaller embedded processors, continues to reconcile desktop and embedded environments such that they appear uniform enough to embrace identical methodologies. Beneath the abstraction, important differences remain: as noted above, code in Listing 1 is viable on an embedded GPU. However, it will consume more power, generate additional waste heat, and reduce battery life.

By embracing the lookup table in Listing 3, a device can ameliorate these issues. Additional latency can be maintained at an unnoticeable level (less than one frame) as long as the display dimensions are serviced by an adequately-power GPU with enough streaming processors and memory bandwidth. Typically, this is not an issue because manufacturers must competitively pair their higher-resolution displays with GPUs capable of supporting virtual reality applications and games needing fast-twitch muscle responses.

Contra to popular practice, the Eyedaptic vision aid adopts the approach of Listing 3 to reduce power consumption wherever possible. When multiple independent warping or distortion layers can be placed in series, it is advantageous to combine them into a single lookup table that reflects the joint mathematical transformation. By deferring calculations until they are needed, the "complexity" of any single or composite mapping is nearly mooted—the specific family of radial mapping curves selected is valuable more for its intuitive parameterization and user-friendliness than its ease of computation, and an arbitrarily complex mapping becomes no more expensive in terms of real-time resource cost than a trivial one.

Figure 2:
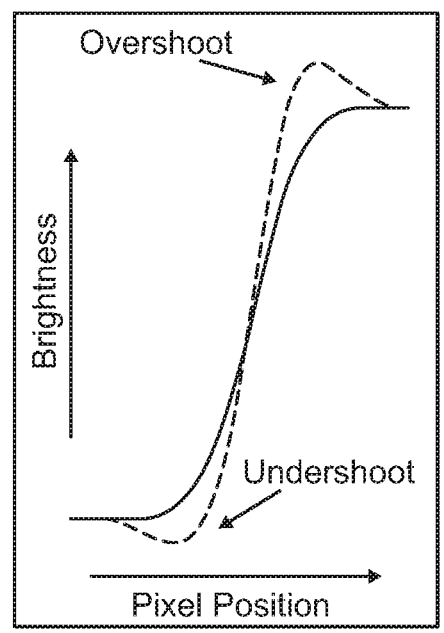
FIG. 2 illustrates the basic effect the Unsharp Masking operation applies within an image.

In its most fundamental form, USM can be described by the block diagram in FIG. 1. Here, X is the original input image, comprising an array of pixels representing image intensity. For multi-component (e.g. RGB) images, common practice dictates that each plane from a subset of available input planes be processed independently to yield a corresponding output plane. A linear high-pass filter H extracts a high-frequency detail image from X, which is then scaled by gain factor g and added to the original image as "enhancement" to give processed image Y. The extent of this enhancement depends on the specific nature (parameters) of H and the value of the gain, with the tradeoffs involved being well known within the image processing community. Basic operation proceeds according to FIG. 2, where a transition in intensity profile across consecutive pixels within an image is made steeper (and hence more noticeable) by adding some oppositely-directed "overshoot" to each side of the transition boundary. Note that although the slope of the transition has been increased and there is higher contrast between the adjacent overshoot regions, contrast between image segments on opposite sides of the transition has not been changed. Thus, USM fundamentally impacts acutance, or apparent sharpness, rather than contrast.

Normally, the value of the gain g is set relatively small, such that the sharpest transitions are enhanced by only a few percent. Choosing the proper value for g is a matter of taste, and must consider the known characteristics of filter H as well as the nature of the source image in order to achieve aesthetically pleasant results. If the gain becomes too large, small amounts of image noise grow increasingly visible and the overshoots depicted in FIG. 2 become exaggerated, forming prominent bright and dark "halos" in the final image (FIG. 3), These halos are universally reviled as undesirable artifacts in all traditional image processing applications of USM, whether intended for sharpness or contrast enhancement.

For low vision users, particularly when reading, it is advantageous to ignore conventional wisdom and instead embrace the potential utility of the halos. By choosing very large gains—exceeding 100% or even 1000%—the intensities of pixels in the overshoot are driven toward saturation and clamped at their minimum and maximum values. The halos thus become highly-visible features that clearly delineate individual letters in text. Because the intensities of halo pixels are saturated to the minimum and maximum possible values, their levels are known and independent of the levels found in input X; they also provide the maximum possible local contrast.

Figure 5:
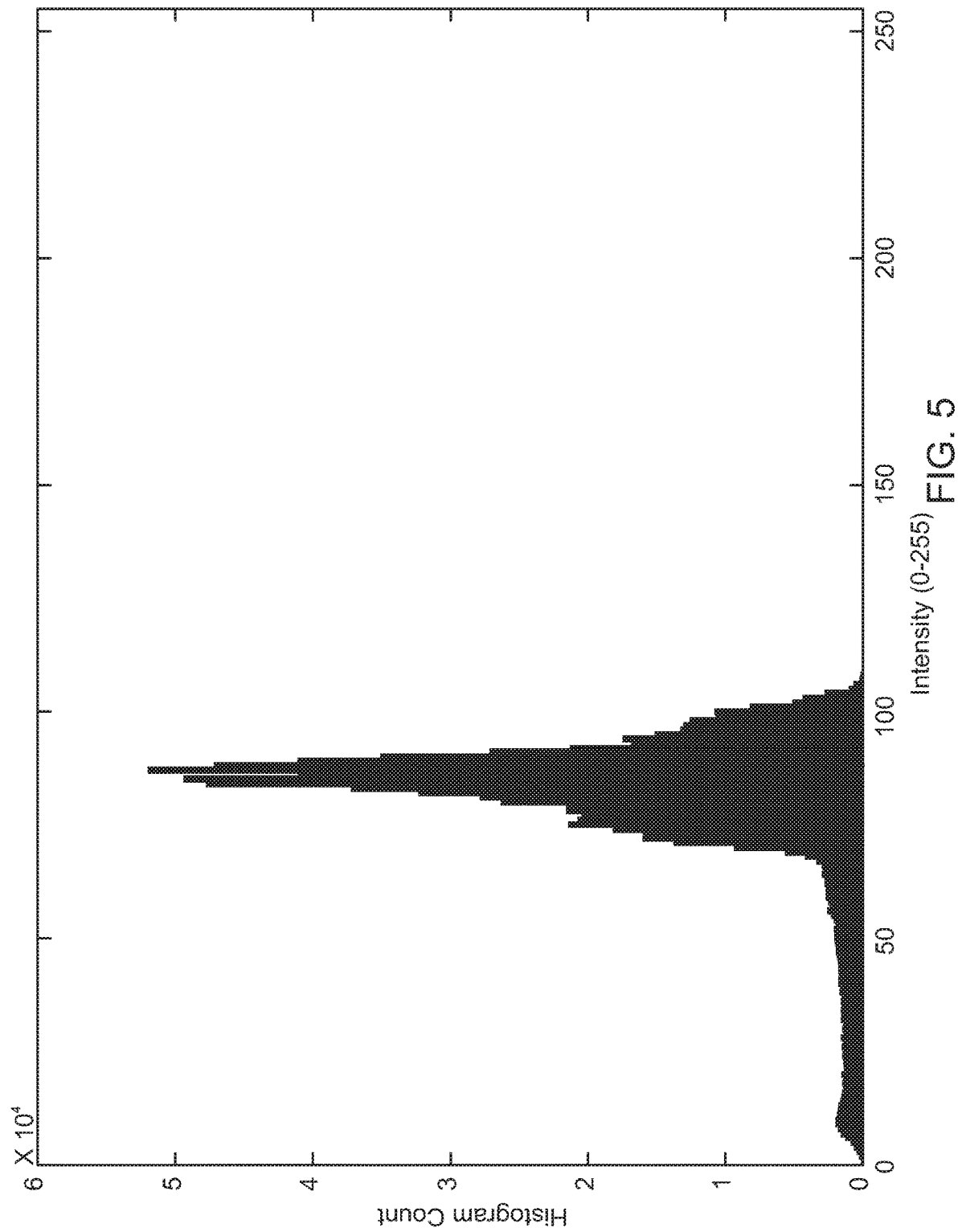
FIG. 5 is the intensity histogram for the image in FIG. 4.

To illustrate, consider FIG. 4. Here, contrast is low even though the camera captured the image under favorable conditions: a well-lit office with text consisting entirely of black ink on a white page. The corresponding intensity histogram in FIG. 5 shows that the entire image uses less than 40% of the available dynamic range, and it is difficult to locate a definitive boundary between text and background based solely on intensity. Here, presence of a shadow and uneven lighting in FIG. 4 only slightly exacerbates this problem (apparent in FIG. 5 as smaller peaks offset from the widest and tallest peak), but under less optimistic reading conditions (e.g. newsprint) the dynamic range spanned by the histogram can be even smaller. On the other hand, in FIG. 6 with USM and g=10.0 any pixels that are purely white or purely black are definitely associated with a text boundary or other prominent edge. Even without further processing, these features draw attention regardless of the global contrast levels in the input image.

An alternative formulation that yields unexpected results is obtained by selecting a large but negative gain, such that the scaled output of the highpass filter is subtracted from the original image rather than added. Sample output is shown in FIG. 7, where text appears inverted and white upon a dark background; note however that the image has not simply been inverted—the background appears relatively dark due to the low brightness of the paper as captured by the camera. Because the intensity of background pixels is approximately 40% of full scale (as confirmed by FIG. 5) but the text-shaped halos are saturated at 100%, dynamic range is increased and contrast between text and average background has nearly doubled. This technique works well for the range of text sizes pictured in the figure, but filter H will require tuning to match the spatial characteristics for dramatically different sizes.

Figure 3:
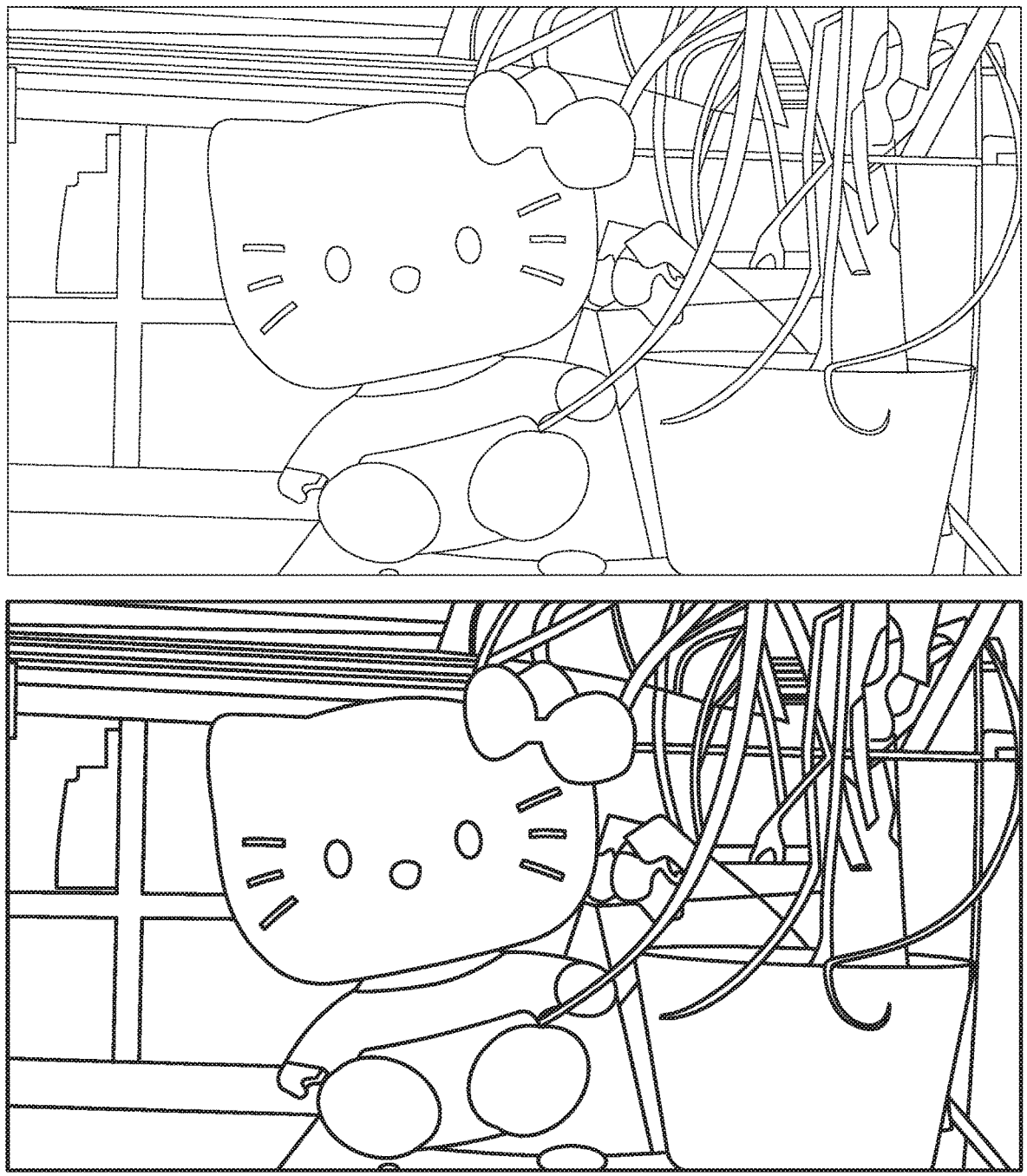
FIG. 3 demonstrates the appearance of halos that form on a non-textual image with high values of USM gain parameter g.

When the modified USM technique with high gain (positive or negative) is applied to a more general non-textual image, halos remain visible but do not otherwise distort or obscure the view (as demonstrated in FIG. 3). Thus, a low-vision user employing USM as in FIG. 1 with a very high gain can be reading, but periodically look up to examine his surroundings before returning to the reading without becoming disoriented. It is also possible to use the output for negative gains to produce high-quality binarized (two-level, pure black and white) output images, providing the maximum possible contrast for very low additional computational effort. Of course, the resulting lack of gradation in the display reduces its usefulness in non-reading contexts.

To effect this binarization, recall once more that because the intensities of the halo pixels are saturated to the minimum and maximum possible values, their levels are known and independent of the levels found in the input. When the source image contains text with sufficient (but not necessarily high) contrast, all text edges can be relied upon to produce these halos. Therefore, extremely simple additional processing consisting only of slicing (binary thresholding) is sufficient to obtain maximal-contrast text images (FIG. 8).

A noteworthy property of this binarization process is that a wide range of fixed thresholds produces satisfactory (and nearly identical) results over a variety of source lighting conditions and input contrast, whereas direct binarization of an image requires global analysis to determine the proper threshold—if a single threshold is in fact viable. This insensitivity to threshold is possible because the saturated halos effectively pre-binarize and implicitly isolate the salient portions of the text image. Higher quality binarized text can be obtained by further processing, including using saturated-white regions from FIG. 7 as a mask to help grade binarization results obtained in other ways. Of course, binarized text is also amenable to optical character recognition.

An important aspect of low-vision image processing is the need for magnification. Individuals with central visual field loss typically require at least 2.5-3.5× magnification to attain sufficient non-central acuity for most visual recognition tasks including reading. The conventional wisdom for combining zooming with USM (or any detail-enhancing technique) is to apply a high-quality magnification algorithm prior to the enhancement. This approach is motivated by the desire to produce aesthetically pleasing results by bringing out fine details in the zoomed image without subjecting unwanted processing artifacts to magnification. For low-vision users, this is counterproductive: it is important for the halo itself to be amplified by magnification—otherwise, zooming prior to USM effectively stretches transitions across more pixels, lowering their frequency content and engendering weaker halos due to smaller overshoots for any given choice of H and g.

Generalizations of the diagram in FIG. 1 will be readily apparent to those familiar with image processing techniques, because such generalizations are often employed as modifications to USM for ameliorating various artifacts or deficiencies that arise during processing. These adjustments remain applicable to the new system described here, generally in ways that will obvious to experienced practitioners. The most common enhancement is the replacement of the linear HPF with a nonlinear HPF that suppresses lower-level filter outputs because they are associated with smaller or shallower transitions that are more likely to represent spurious image noise.

Finally, note that the modifications to USM described here also permit reduced-complexity implementations of the block diagram in FIG. 1. Consisting of little more than a single linear filter, this system is already considered to have low complexity, and techniques for achieving low-power realizations with real-time performance are readily accessible. For the novel usage model(s) described above, low-vision users do not share the same concerns as normally-sighted individuals with respect to processing-induced artifacts: some artifacts will remain imperceptible due to reduced acuity while others are recognized as desirable features rather than jarringly unpleasant flaws. Thus, the specifications of filter H can be relaxed when compared against the requirements of highpass filters used in typical USM applications dominated by stringent aesthetic considerations. Consequently, realizations needing fewer implementation resources (power, time, computing hardware, etc.) are enabled.

Figure 9A:
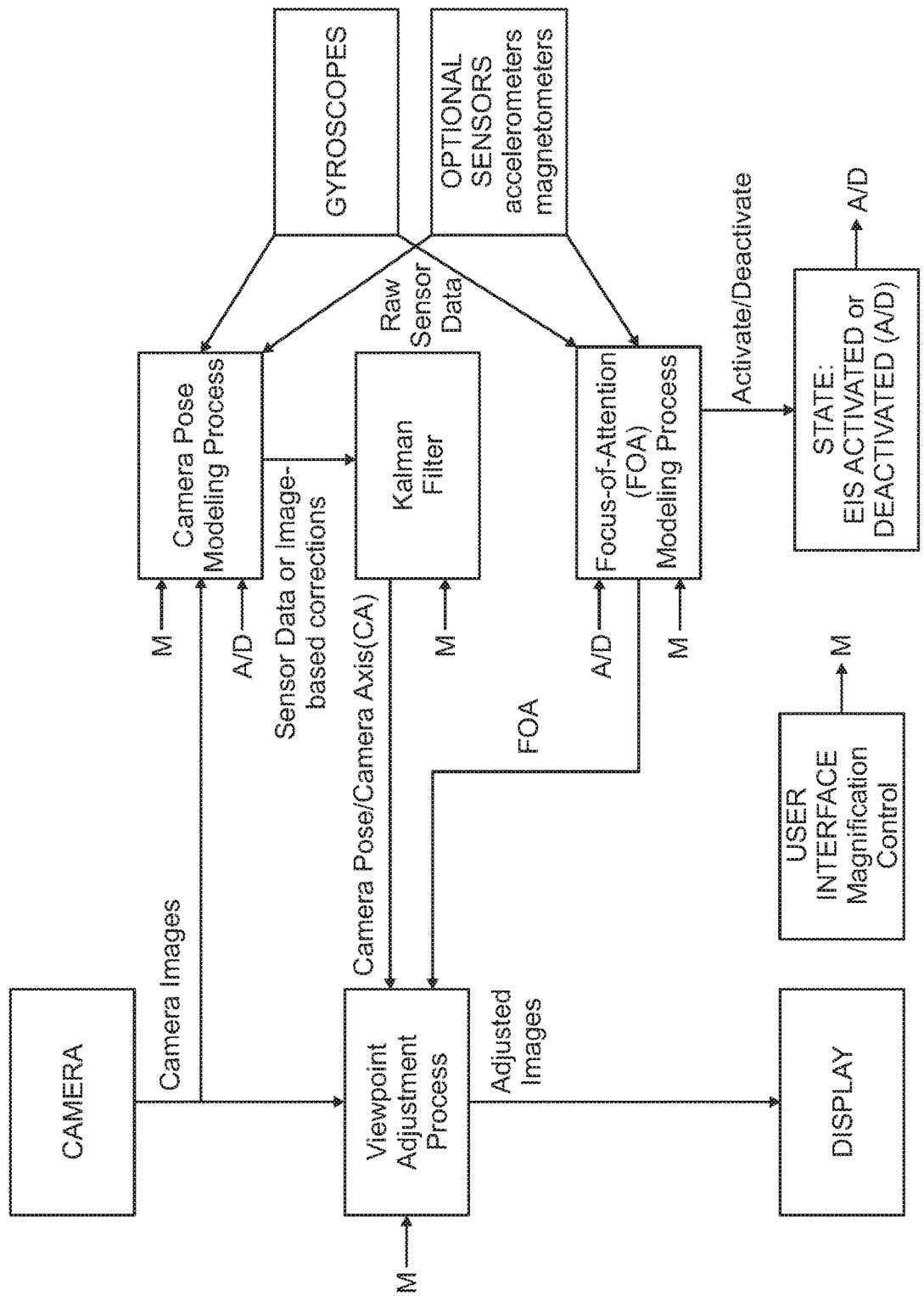
FIG. 9 (A) is a high-level block diagram showing major components, processes, dataflow and interactions in an Electronic Image Stabilization implementation suitable for low-vision users in a wearable electronic visual aid device.
Figure 9B:
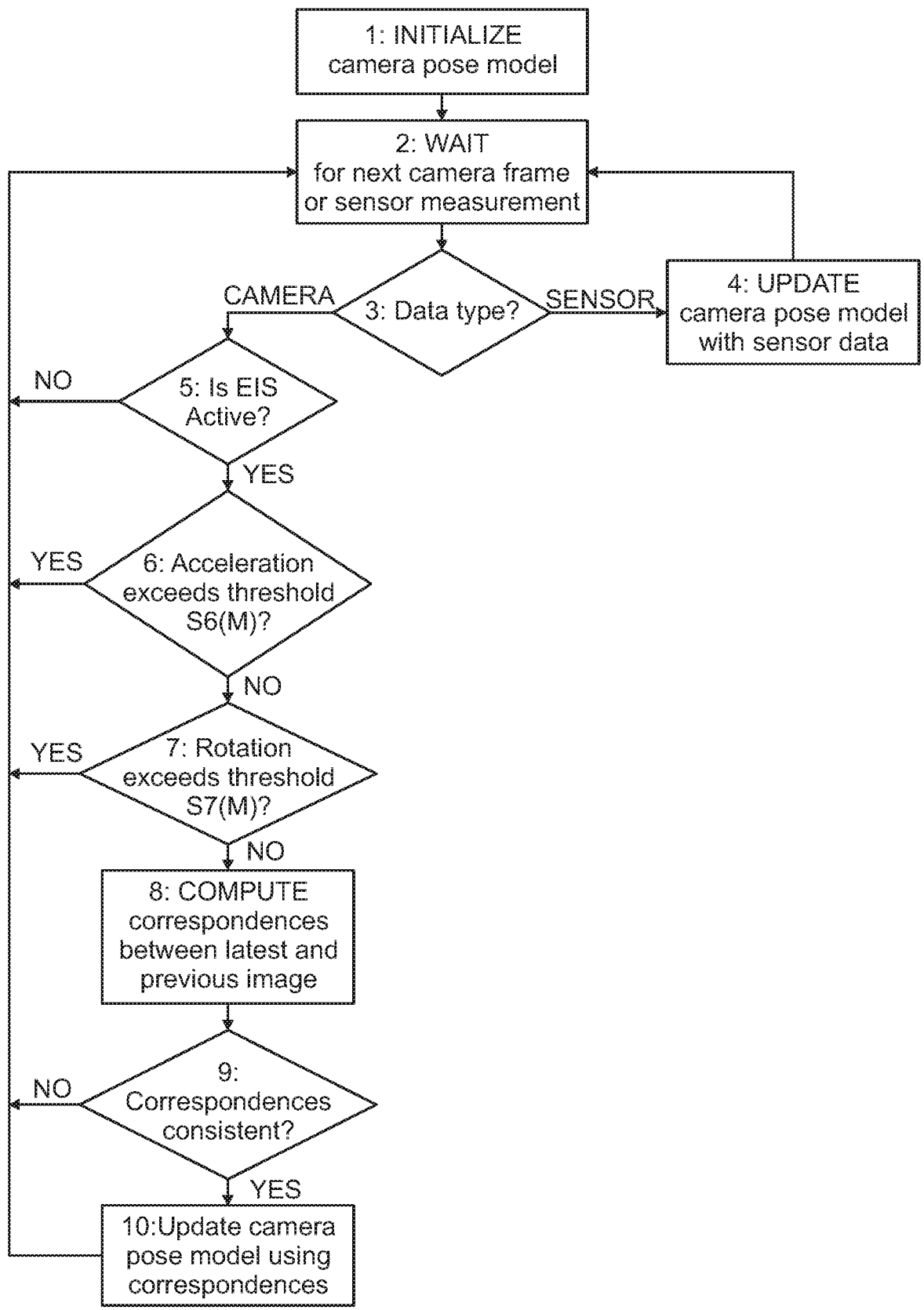

Referring also now to FIG. 9 (A), which presents a high-level block diagram illustrating the major hardware blocks, software processes, dataflow, and interactions comprising the EIS system described here for embedding in a wearable electronic visual aid that is suitable for low-vision users. This block diagram is not intended to be a complete representation of the system detailed below, but rather a didactic reference providing high-level context to facilitate understand the ensuing details as they are presented. Also, the diagram (and this document as a whole) only considers EIS per se, isolating its salient points and disregarding issues concerning its integration or interaction with other subsystems comprising the whole of the electronic visual aid.

From the user point-of-view, the system consists primarily of the three blocks in the leftmost column of FIG. 9 (A): the system captures video with a digital camera, applies some processing to the image stream (via the Viewpoint Adjustment Process block) that stabilizes the video in the presence of tremors or other inadvertent and undesired movements, and displays the processed video. All of this occurs in real-time, with imperceptible latency. The only available user-level setting (available via the User Interface block) is a control for varying the magnification level, M, between 1.0 (no magnification) and some implementation-specific upper limit. Typical low-vision users require at least 2.5×-3.5× magnification to succeed at common visual recognition tasks, hence maximum supported values of Min the range of 10×-15× suffice for the vast majority of potential users. Many blocks in the diagram show M as an input, indicating that their behavior depends on amount of selected magnification.

Behind the scenes, additional processes operate. A Camera Pose Modeling Process ingests raw data obtained from gyroscope sensors and, optionally, additional sensors such as accelerometers and/or magnetometers. Sensor data arrives at a high enough rate for the process to build and maintain an accurate real-time estimate of the camera orientation (attitude, also known as camera pose) in space, tracking changes as it moves and rotates in conjunction with the glasses and the user's head. A signal-processing construct known as the Kalman filter encapsulates and realizes the computations necessary for efficient and, accurate estimation of camera pose. When possible, the camera pose modeling process also uses visual cues extracted from the image stream to guide the Kalman filter toward increased verisimilitude.

Concurrent with camera pose tracking, a Focus-of-Attention (FOA) Modeling Process independently attempts to decide which motions reported by the hardware sensors represent spurious noise and inadvertent or otherwise undesired movements. By making these decisions, using trends to predict future head motions, and evaluating past predictions against new measurements, it forms an estimate of the user's intended gaze direction. Even for users with normal visual acuity, this desired direction, or FOA, can differ from the camera orientation due to fatigue-related tremors. With low-vision users employing high-levels of magnification, sensitivity of camera axis to motion is increased such, in severe but not necessarily extreme cases, that even the wearer's heartbeat can become a distractive nuisance.

The Viewpoint Adjustment Process, mentioned previously, reifies the process of image stabilization by reconciling the achieved camera pose with the desired FOA. By applying geometric transforms based on the difference between these two gaze directions, it produces an image simulating the appearance of a scene as it would have been captured when looking in the desired direction. Magnification is also applied by this block.

The unmentioned final block in FIG. 9 (A) is labeled State, and encapsulates a signal labeled "A/D" indicating whether or not EIS is active (i.e. actively attempting to compensate for motion). This control is indispensable as large-scale or sudden movements nearly always signal deliberate motions that will radically change the user's actual (versus estimated) FOA. While they occur, it is not appropriate to attempt to counter them. Instead, the displayed viewpoint should precisely match what the camera captures until the wearer choses a visual reference upon which to settle and concentrate. The FOA modeling process controls and uses this state variable, but it is also respected by the camera pose modeling process.

The block diagram from FIG. 9 (A) is typically embodied in a wearable electronic visual aid that resembles eyeglasses. SEE for example, FIGS. 11A and 11B. Electronic displays are situated immediately in front of the eyes, and the camera or cameras are mounted to capture images including at least the forward field-of-view for the wearer. An important requirement, easily satisfied, is that the camera(s) and sensor(s) be rigidly mounted so as to hold mutually fixed spatial relationships among themselves. Similarly, the camera(s) and sensor(s) must maintain a relatively stable position with respect to the wearer's head; the eyeglass form factor helps satisfy this requirement—occasional settling or manual adjustments can be accommodated automatically, but frequent or large motions cannot.

EIS implementations can operate statically or dynamically. In the static regime, a camera is nominally rigidly fixed and immobile; hence, any measured motion is considered undesirable and subjected to full compensation. Practical applications for static EIS do exist, such as fixed security cameras or multi-exposure digital photography. For them, it is only necessary to obtain an estimate of the current pointing error due to accumulated motions, and then apply the requisite geometric correction to the image.

Many important applications, however, have dynamic elements, and further effort is required to distinguish inadvertent or otherwise undesirable motion from deliberate movements. When stabilizing a head-mounted camera, in particular, it is necessary to distinguish involuntary motions from the controlled attempt to keep an object in view by tracking its motion. For low-vision users employing moderate or large amounts of zoom, additional complications arise. These confounding features and their solutions will be examined below.

The dynamic EIS solution presented here addresses three issues: determination of the camera pose, maintenance of a focus-of-attention model, and viewpoint adjustment—corresponding to the three principal processing blocks dominating the implementation complexity of FIG. 9 (A). The invention disclosed here contributes novel elements to all three aspects of the problem.

Camera Pose Determination

The first aspect of dynamic EIS (or static EIS) to be considered here is determination of camera pose. The concept of camera pose normally encompasses a detailed model of both the position and attitude of the camera, either relative to some starting (but possibly unknown) pose or with respect to some specified absolute coordinate system.

Such complete details are necessary for accurate positioning in Virtual Reality (VR) applications and a large subset of Augmented Reality (AR) tasks. However, for an electronic visual aid presenting processed images from rigidly-attached camera that shares roughly the same field-of-view as the eyes, tracking translational camera movements is unnecessary for stabilization; the assumption is that translation (as opposed to rotation) of the head is always voluntary, and the displayed image subsequently must not be adjusted to remove its effects. The identical simplification is often made in hand-held camera implementations of EIS.

Determining camera pose in this simplified context requires keeping track of only the rotational orientation of the camera as time passes. This is most often accomplished using low-cost commercial-grade MEMS gyroscopes that sense instantaneous angular velocity of rotation about three mutually perpendicular axes while providing measurements at regular intervals. Software must continuously collect and process data from these sensors, numerically integrating angular velocities to obtain and maintain an aggregate estimate of orientation. Because MEMS gyroscopes are known to suffer from significant short-term drift, it is common to employ accuracy-improving data fusion techniques such as a Kalman filter or complementary filter that incorporates measurements from auxiliary devices such as MEMS accelerometers and magnetometers. The additional devices—mounted in a rigidly-fixed relationship with the gyroscopes—can also provide references for distinguishing absolute directions: accelerometer measurements of gravity not only isolate a local plumb line, but also distinguish up from down; similarly, magnetometer measurements can reveal the local magnetic north.

The Android operating system found on many mobile devices provides integrated data fusion, yielding a device pose model that purports to be usable as a turnkey camera pose model. Unfortunately, although this typical exemplar of fusion is robust enough for EIS in general-purpose hand-held-camera applications, it proves inadequate for the head-mounted electronic visual aid devices.

One reason for this deficiency is the adoption of ad hoc proprietary calibration procedures that disrupt the smooth flow of fused pose estimates. Every manufacturer of commodity MEMS gyroscopes (or inertial measurements units—IMUs—integrating gyroscopes with accelerometers and/or magnetometers in a common package) delivers a proprietary integration driver package performing some level of opaque data processing prior to delivery of measurements to the operating system or higher-level software. Among other functions, this driver is responsible for calibrating MEMs devices so that accurate measurements are delivered. When operated continuously, these calibration routines actually significantly degrade accuracy in very important use cases because they easily confuse steady, deliberate movements (such as panning the head while reading) with artifacts due to device drift.

The crux of the problem is a periodic stopping and restarting of the calibration protocol, almost universally at times when the device appears to be relatively motionless and hence deemed not to be in active use. In fact, for an electronic visual aid this can be the worst possible time to initiate calibration, as the wearer might be actively concentrating on making painstakingly careful movements. The result in an EIS context is particularly confusing, as the system appears not only to interpret stillness as motion and vice versa, but also to change its behavior at random intervals. This frustrating behavior has been noted in IMU drivers from all major vendors (Invensense/TDK, Bosch, Analog Devices), as well as in embedded operating systems that provide custom drivers (e.g. Apple IOS).

The solution to this problem for the electronic visual aid is to eschew both the proprietary vendor integration driver and the integrated fusion provided by the operating system. Instead, this EIS system consumes only uncalibrated raw sensor samples, introducing its own Kalman filter to manage both calibration and fusion for producing camera pose estimates. The specification, design, and implementation of Kalman filters for fusing MEMS gyroscope measurements has been well-studied in publicly-available literature, and there are numerous options available that will yield low computational complexity with equivalent performance. The crucial aspect for this invention is that the Kalman filter operates continuously and uniformly, without the "clever" periodic interruptions or restarts that are intended to improve accuracy but instead inject harmful transients into the data.

Furthermore, it is important to select time constants for the gyroscope calibration that are long enough to avoid mistaking slow, deliberate panning motions for inherent device drift; whereas typical Android, IOS, and vendor-supplied software have adopted estimation time intervals on the order of 15-45 seconds, this invention extends that time to a minimum of 90-120 seconds—and there is little cost for further increases, aside from longer startup intervals. If temperature changes are not anticipated and reliance on an explicit calibration phase (where the device will remain stationary) is viable, then it is also possible to perform a one-time drift measurement and forgo continuous drift compensation.

Calibration-related transients analyzed above are a significant problem with traditional implementations of MEMs-based pose estimation, but there is also a more fundamental limitation that seriously impacts its effectiveness for low-vision users. Low-cost commercial grade MEMs in integrated IMUs incorporating a complete set of gyroscopes, accelerometers, and magnetometers for "nine degree-of-freedom" or "nine-axis" motion and pose measurement are available from multiple vendors in bulk quantities for only a few dollars per unit. When incorporated into systems combining their measurements via commonly-used data fusion algorithms, best-in-class performance is on the order of one degree RMS (root-mean-square) of measurement error along each of the three principal axes. Moving to industrial-grade products (which still employ MEMs devices) increases the cost by a factor of 100 while only reducing residual errors by half. Navigation-grade components are significantly better, but come only at prohibitive cost in money, power, and size.

A one-degree RMS residual error does not seem very large, and when achieved on a hand-held camera with a normal field of view, will generally be considered very satisfactory. Commonly-available high-quality augmented-reality glasses that can be used for electronic visual assistance devices, however, have displays with diagonal fields-of-view ranging from 30 to 50 degrees. For the smaller FOV, this corresponds to approximate horizontal and vertical fields-of-view of 26 and 15 degrees, respectively. When combined with magnification factors exceeding 3×, as commonly employed by low-vision users, the entire zoomed display spans scant enough degrees that a single degree of RMS error is significant, particularly since it is a dynamic and randomly drifting error that will generally exceed 1 degree about one-third of the time. This magnitude of error is especially annoying for users who are capable of achieving results approaching or exceeding one or two degrees of stability without assistance; in that case, the error is actually exacerbated by the algorithm.

To address the accuracy problem, an additional source of data is introduced into the Kalman filter fusion process: the image stream itself. By comparing the most recent camera frame with the one preceding it, image correspondences—recognizable features located in both images—can be analyzed to see how the camera has moved; the result is then used to update the pose estimate. It is reasonable to assume that the user is viewing a scene with sufficiently static characteristics for this process to work, and that only relatively small rotational head motions are present—recall that increased accuracy is only needed when magnification is present, and required accuracy increases in direct proportion to the amount of additional zoom. Thus, accelerometer and gyroscope measurements are consulted, and if recent movements exceed thresholds established using simple algebra based on the amount of magnification, then the image-based update is not used; otherwise, the estimated error between the current pose model and the model implicit in the image correspondences—calculated by assuming all error sources are due to small camera rotations—are applied as a Kalman filter state update.

A high degree of complementary and synergy arises from this approach, as the assumptions that it relies upon can, be verified before applying it. Both the amount of magnification and the 1-degree RMS accuracy of the MEMs-only solution reduce the complexity of the search for corresponding features between the two images, and feature match only contributes to the solution when its results are highly consistent with device measurements from the most recent frame interval. Image correspondences can also be graded and accepted based on their self-consistency across the image; whenever a high-confidence feature match is not achievable, it indicates a high-dynamic condition where either the device or scene possesses too much motion for effective viewing with a high level of magnification. Finally, accuracy of this approach is very high: the lower-accuracy pose estimate narrows the search space to isolate the image correspondences that reconcile the latest image pose against the previous one to within approximately one pixel.

Methods for efficiently establishing correspondences between consecutive images in video are well-known within the computer vision community. There is considerable extant literature for a technique named Structure From Motion (SFM) that produces motion and pose estimates using only the information present in a video stream, i.e. without gyroscope, accelerometer, or other instrument measurements. There has been work on fusing SFM with instrument measurements as well, but these fail to exploit the reduction in complexity described above. Furthermore, the implementation described here does not even attempt SFM per se; instead, it uses heuristics to decide whether or not a limited analysis of the images is likely to be beneficial.

Returning to the topic of the camera pose model itself, note that it is sufficient to consider estimated camera pose relative to some fixed but unknown or uncalibrated reference point. This is the easiest approach since gyroscopes only measure rotation rate and not rotation angle; an unknown constant offset naturally remains when numerically integrating the measurements. It is also a well-accepted practice that introduces no theoretical difficulties. Just as significantly, it raises no additional practical issues because in this application, wherever the user directs his gaze is effectively the most important location and all other locations or orientations only exist with respect to this local reference. Philosophically, this viewpoint—which is directly mirrored by the camera pose and FOV modeling processes that exclusively consider incremental changes to a current state—diametrically opposes that espoused by immersive VR where it is vitally important to observe absolute coordinates to support "accurate" rendering of the world.

The exact structural form of modeled pose is not important; either of the common representations—individual rotation angles (roll, pitch, and yaw), rotation matrices, or unit quaternions—suffices, and detailed examples of Kalman filter implementations for each case are available in the open literature.

Similarly, a large number of Kalman filter variations and enhancements are available to experienced practitioners; due to the relative simplicity of the system being modeled, even the most basic Kalman filter topology will yield adequate results with minimum computational complexity and power consumption. One crucial strategic difference from standard configurations must be observed: the dynamic performance of the Kalman filter in response to its inputs must be adapted to the amount of magnification present by adjusting its time constants in inverse proportion to the applied zoom factor. This nuance arises because increased apparent sensitivity to motion always accompanies higher magnification; subsequently, additional stabilization must be provided to damp out motion components that would remain imperceptible or unobtrusive at lower magnifications. Of course, some limited user-customization of the stabilization strength is also mandated, as physically frail or fatigued users will likewise benefit from further increased assistance.

FIG. 9 (B) contains a flowchart for an algorithm that maintains the camera pose model. The boxes in this drawing are described in detail below, adding to the more general information presented above.

In Box 1, the camera pose model is initialized to begin the process. For relative pose models, the initial value indicates no rotations, i.e. roll, pitch, and yaw components are all zero. For absolute pose models, the best available estimate of absolute orientation is used—this may be available from an external source such as the operating system on an Android device, or it can be cleared to indicate no rotations if the Kalman filter is designed to incorporate magnetometer and gravity measurements such that the model will converge to absolute coordinates.

Box 2 represents the start of the main loop of the camera pose modeling algorithm, which awaits the arrival of the next available sensor measurement or camera frame. The algorithm can process individual measurements as they arrive from disparate sensors or it can process multiple measurements that arrive simultaneously. If the update rate is sufficiently fast (typically exceeding a few hundred measurements per second), it can also wait until a desired subset of measurements arrives, e.g. one each from the gyroscopes and accelerometers. However, it must handle camera data separately from the other sensors; simultaneous camera and sensor data may be serialized and handled in arbitrary order.

Box 3 is a branch point that determines which processing path to follow depending on the type of new data that has arrived.

Box 4 represents all processing that occurs for new sensor data, but not camera data. The Kalman filter methodology is used to update the camera pose model using the new sensor data sample(s), and control then returns to Box 2.

Box 5 is the first step in processing of a new camera image. If EIS is inactive (normally because the FOV modeling process, q.v., has determined that significant motion is in progress), image information is not used to update the pose model and control returns to the main loop in Box 2. Otherwise, control continues with Box 6.

Boxes 6 and 7 check recent acceleration and rotation measurement history during the time that has elapsed since the previous camera image arrived. If the acceleration exceeded threshold S6(M), or any accumulated rotation exceeded threshold S7(M), then sufficient motion is judged to be present that it is unlikely for useful image correspondences to be obtained so control returns immediately to the main loop in Box 2. The threshold for the acceleration comparison is denoted S6(M) to indicate that it can be chosen independently of all other thresholds (i.e. it is specific to this Box 6) and it depends on the amount of magnification. In fact a single coefficient is sufficient to represent S6 for M=1.0 (no magnification), with a simple algebraic formula reducing the threshold as M increases. Similarly, S7(M) is magnification-dependent and unique to Box 7. Specific values and formulas for these thresholds depend on resolution of the display and the camera, and also on how much movement must be tolerated; once these quantities are known, simple algebra can be used to derive practical thresholds.

Box 8 computes correspondences between the latest image and the previous one. Many well-known methods for establishing such correspondences are available within the image processing the computer vision literature. These include brute-force correlation of the image pairs as well as a plethora of more elegant techniques for separately extracting features from each image (e.g. SIFT, the scale-invariant feature transform) before attempting to form correspondences. Note that potential correspondences are always explored using the original camera images, but a computation-saving optimization is realized by initially confining the search to central areas, expanding outward only if too few likely features are located. Furthermore, the size of this central area and required quantity of correspondences can be reduced as the amount of final magnification increases.

Box 9 determines whether the correspondences derived using Box 8 are sufficiently self-consistent as well as compatible with the general trend evinced by pose model evolution since the previous image arrived. Several types of self-consistency are screened. First, potential feature matches are individually rejected if they correspond to excessive motion well outside the expected accuracy limits of the pose model. Next, the remaining collection of potential matches is graded and culled using a statistical consistency checking method such as the well-known RANSAC (random sample consensus) algorithm for identifying outliers. Finally, another RANSAC pass is used to decide whether the accepted set of correspondences is statistically consistent with a single dominant simple motion (instead of, e.g. several different localized motions that might manifest when viewing a moving object within the frame of a stationary television). Failing to meet any of the consistency criteria causes control to return to the main loop in Box 2 without affecting the pose model via Box 10.

Box 10 employs the Kalman filter methodology to update the camera pose model using the difference between pose model changes accumulated since the previous camera image (i.e. without using the most recent image) and the pose model changes measured by using image correspondences. This difference effectively becomes an additional error measurement that serves to correct and fine-tune the model since the image correspondences are screened for high reliability, accuracy, and consistency with assumptions. Afterwards, control returns to the main loop in Box 2.

Focus-of-Attention Modeling

The desire for EIS reflects the fact that the camera axis (CA), which is readily extracted from the camera pose, is not always pointed where the wearer intends. In static applications, the camera mount implicitly fixes the desired orientation at all times. With dynamic EIS, determining that intended target presents an additional problem. The EIS implementation described here supports this determination by maintaining a mathematical model for Focus-of-Attention (FOA) that indicates the direction in which the user is believed to want to aim the camera axis. Whenever EIS is inactive, FOA and CA always coincide and there is never any need to adjust the camera image with geometric viewpoint corrections. Otherwise, the FOA modeling process must autonomously determine which aspects of measured motion are deliberate and which are incidental before updating the FOA accordingly.

Figure 10:
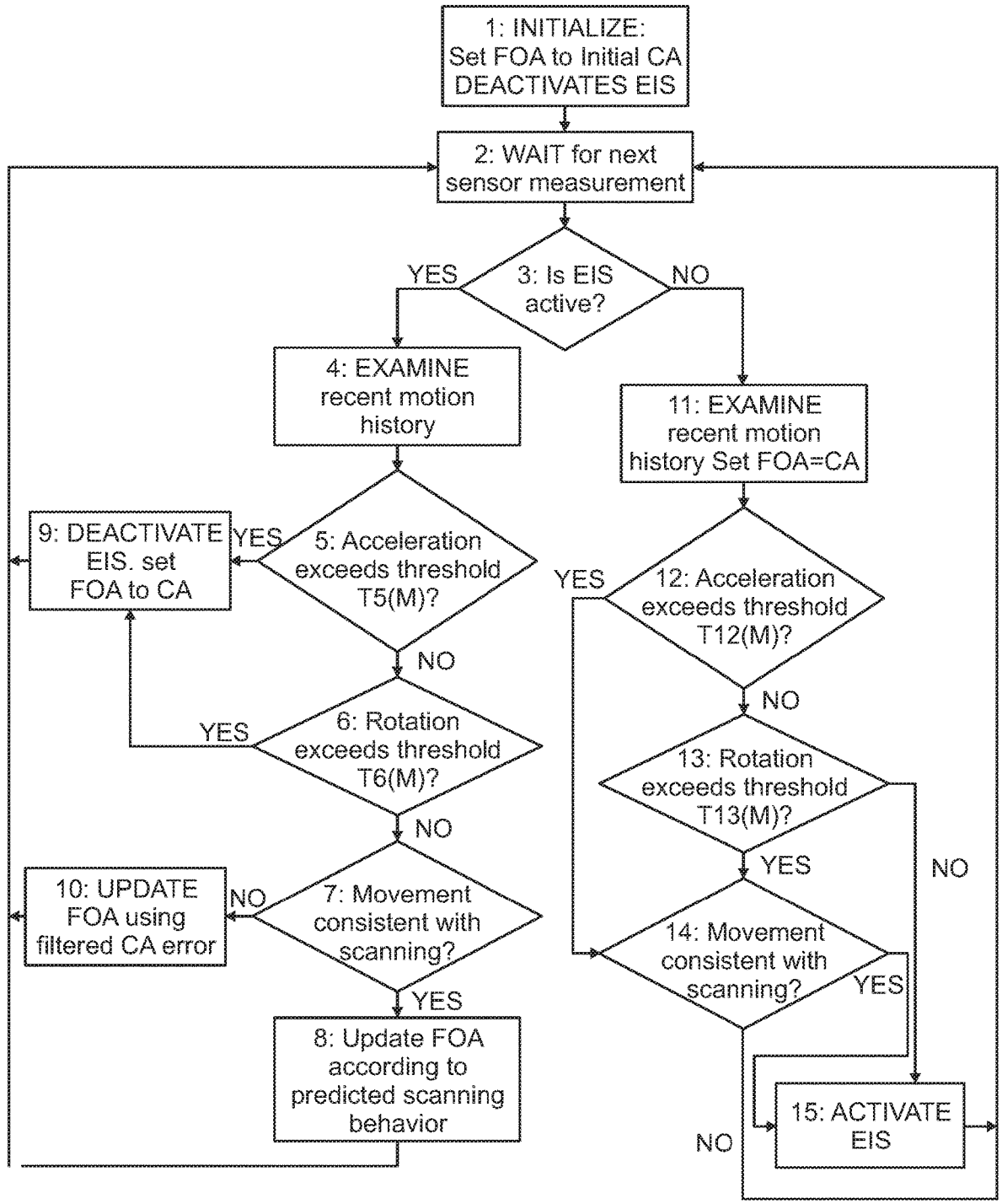
FIG. 10 is a flowchart describing the operation of the camera pose modeling process depicted in above and below and described in the text.

A high-level flowchart for the FOA modeling algorithm is presented in FIG. 10 and examined in detail below.

In box 1, the model is initialized and the FOA is set to match the current estimate of CA, as obtained from the initial estimate of the pose. EIS is also deactivated, meaning that it is not actively being used to modify captured images even though signal processing related to pose estimation and FOA still occurs; i.e. EIS is not disabled. Note that the mechanism(s) for enabling and disabling EIS, which can be under user control or fully autonomous, exists independent from this flowchart.

Box 2 represents the start of the main loop of the FOA modeling algorithm, which waits for the arrival of the next available sensor measurement. The algorithm can process individual measurements as they arrive from disparate sensors or process multiple measurements that arrive simultaneously. If the update rate is sufficiently fast (typically exceeding a few hundred measurements per second), it can also wait until a desired subset of measurements arrives, e.g. one each from the gyroscopes and accelerometers.

Box 3 is a decision point, marking the beginning of different processing choices depending on whether EIS is currently active or not. Broadly speaking, when active the FOA is updated according to the difference between predicted and measured motion unless the detected motion is sufficiently large to warrant deactivating EIS; when inactive, the FOA remains identical to CA until conditions are detected for activating EIS. Finer points of these processes are elucidated below.

Box 4 begins the processing for active EIS. Recent motion history obtained from the sensors, both acceleration and rotation, are examined and used to make a series of subsequent decisions. The specific amount of history consulted depends on the time it takes to detect scanning behavior (q.v. box 7).

Box 5 checks to see whether recent acceleration (over a very short time scale, generally not exceeding the video frame time) is large enough to indicate either a significant head and/or body translation motion such that EIS should be deactivated. The threshold for this comparison is denoted T5(M) to indicate that it can be chosen independently of all other thresholds (i.e. it is specific to this Box 5) and it depends on the amount of magnification. In fact a single coefficient is sufficient to represent T5 for M=1.0 (no magnification), with a simple algebraic formula reducing the threshold as M increases. A more specific formula and initial threshold can be adjusted to suit the user, or can be chosen based only on desired sensitivity for the application (independent of user preferences). If the threshold is exceeded, then EIS is deactivated and the FOA is reset to match CA via Box 9, where processing of the most recent sensor measurements ends.

Box 6 checks to see whether recent rotation (over a very short time scale, generally not exceeding the video frame time) is large enough to indicate a significant head rotation adjudged to be a deliberate attempt to reorient FOA. The threshold for comparison is denoted T6(M) and functions in a corresponding way to T5(M) (cf.) described for Box 5, but otherwise remains completely independent of T5(M). Derivation of thresholds that avoid trying to compensate motions using pixels outside the available image are a matter of elementary algebra, or values and formulas can be tuned heuristically. If the threshold is exceeded, then EIS is deactivated and the FOA is reset to match CA via Box 9, where processing of the most recent sensor measurement ends.

Box 7 analyzes motion history, potentially both acceleration and rotation, to determine whether or not recent movement is consistent with specific slow, purposeful motions associated with deliberate behaviors like reading. These behaviors are termed "scanning" here, and correspond to simple drawn-out motions like panning the head from slowly from left to right (e.g. while reading Western languages) or reversing direction and panning more quickly from right to left, possibly tilting the head slightly downward first (e.g. at the end of a line when reading). If the most recent previous sensor sample(s) were already determined to be consistent with scanning, then it is not necessary to consult history to make the decision—it remains only to decide if the new sample remains consistent; otherwise, sufficient history must be examined in conjunction with the new samples to render a judgement. Tracking this behavior is ideally suited to state machine models, including probabilistic Hidden Markov Models (HMMs) that can encompass multiple simultaneously-active possibilities. HMMs are well known among signal processing and pattern recognition practitioners since they engender simple and efficient implementations. Depending on the decision from Box 7, the FOA model is updated differently by either Box 8 or Box 10.

Box 8 updates the FOA when scanning behavior is declared to be ongoing. A predictive model for the scanning behavior, based on the specific historical motions that are consistent with scanning, is used to change FOA so that it is closer to the predicted model. This model is implemented and maintained in Box 7 (e.g. using Hidden Markov techniques that help predict deliberate motions by extrapolating previously observed motions along likely paths), and the FOA state update is made according to any of the numerous well-established techniques taught by control system theory, where negative feedback is used to reduce measured errors in servo systems.

Box 10, on the other hand, updates the FOA when scanning behavior is not detected. Here, the FOA update is driven by difference between the current CA and the current FOA. As in Box 8, this is a servo control system for reducing the error between a measurement (CA) and associated model (FOA), allowing the two to converge smoothly while suppressing noise and random variation.

Box 11 begins processing for inactive EIS. As in box 4 (q.v.), recent motion history obtained from the sensors—both acceleration and rotation—are examined and used to make a series of subsequent decisions.

Boxes 12 and 13 compare recent acceleration and rotation motions, respectively, against individual thresholds T12(M) and T13(M). The thresholds are analogous to the respective T5(M) and T6(M) (cf.) mentioned above, but can and should be chosen independently. If neither threshold is exceeded, then motion is deemed to be held deliberately still; this is an indication that the user desires to activate or re-activate EIS via Box 15 before returning to the main loop in Box 2.

Box 14, like Box 7, examines recent acceleration and/or rotation history to decide whether scanning motion is detected. Unlike Box 7, Box 14 is never entered while a tentative scanning model is active, so it will always be necessary to consider more than the most recent measurement sample (although efficient HMM techniques can support an incremental decision process that shares state with Box 7). Once scanning behavior has been detected, EIS is activated via Box 15; either way, processing of the current measurement ends and control returns to the main loop in Box 2.

Viewpoint Adjustment

Image stabilization with a wearable electronic visual aid (whether intended for a low-vision audience or not) is intended to replace the natural view (or portion thereof) provided by the unaided eye. Though not obvious, this fundamentally changes the nature of the task when compared to the stabilization requirements of a handheld video camera with separate playback of media on a distally-located display device.

To appreciate this, consider the most basic dynamic image stabilization task, where the goal is to hold the camera completely steady and focus exclusively on a static scene. Operating in this simple regime, all motion is judged undesirable. Traditional EIS in a standalone camera system would oblige by compensating all detected motions, ideally resulting in a final image that remained static regardless of the camera pose. However, this would be not acceptable in a wearable device. During normal viewing and in typical environments, the human brain continuously maintains a coherent sense of the individual's orientation regardless of dynamic head and eye position. Subsequently, when an individual tilts his or her head left or right while facing forward, he or she does not perceive a correspondingly tilted image even though the plane of the horizon rotates relative to the eyes. The individual is certainly aware of the tilt due to proprioception or the perceived tilt of worn eyeglass frames, but brain automatically stabilizes rotation about this forward-directed axis. It is important to ensure that wearable displays mimic this behavior. The invention described here acknowledges this functional constraint, and unlike other stabilization implementations, decomposes compensated motions into three separate rotational axes (yaw, pitch, roll) so that it can refrain from making roll adjustments. Thus, the viewpoint adjustment process proceeds as follows, according to the conventional rules governing projective geometry and matrix algebra. First, the amount of adjustment is determined by finding the relative rotation that must occur when re-orienting from the current camera axis direction (taken from the current camera pose model) to the desired gaze direction (estimated by the FOA). That rotation is expressed mathematically a standardized form via a homogeneous 4×4 rotation matrix; if CA and FOA coincide, no rotational adjustment is needed and this matrix devolves to become the identity matrix. As discussed immediately above, any roll component is also removed from the rotation matrix.

Next, the matrix is inverted to obtain the rotation matrix transform needed to convert coordinates from the captured viewpoint to the desired viewpoint (i.e. when a camera rotates in one direction, the image appears to rotate in the opposite direction); alternatively, this inverse matrix can be constructed directly by simply reversing the sense of the original rotation. Finally, magnification is applied via multiplication by a homogenous 4×4 scaling matrix to produce a final composite transformation matrix.

When desired, additional adjustments to the final transformation matrix can be introduced at appropriate points to accommodate per-eye offsets from camera location(s) and other configuration-dependent or user-dependent geometric transforms. The proper sequence in which to apply additional transformations will be obvious to those familiar with such transforms. However, if the source camera is mounted in sufficient proximity to the eye, the resulting misalignment will not be noticeable and the additional adjustment to the simulated viewpoint becomes unnecessary.

Given the final composite transformation (possibly one per eye), it remains only to use it to map the pixels from the original camera image into a final destination image (or images) for immediate display. The 4×4 transformation matrix is suitable for direct use in a trivial OpenGL shader that resamples and interpolates the input image to produce the output image. In other shading languages and rendering systems, simplicity and efficiency will be comparable. One final aspect of viewpoint adjustment in the context of low-vision users is noteworthy. If EIS is only used when magnification is present, with a degree of stabilization and maximum compensable rotation carefully computed in relation with the amount of zoom, then it is possible to implement. EIS without further reducing the camera field-of-view beyond the reduction that necessarily accompanies the selected amount of magnification. Under these eminently practical restrictions, EIS neither causes image degradation due to the loss of a reserved buffer zone at the image edges, nor requires a sensor with additional pixels for this buffer. This is a new, emergent advantage specific to of the low-vision EIS implementation.

Figure 11A:
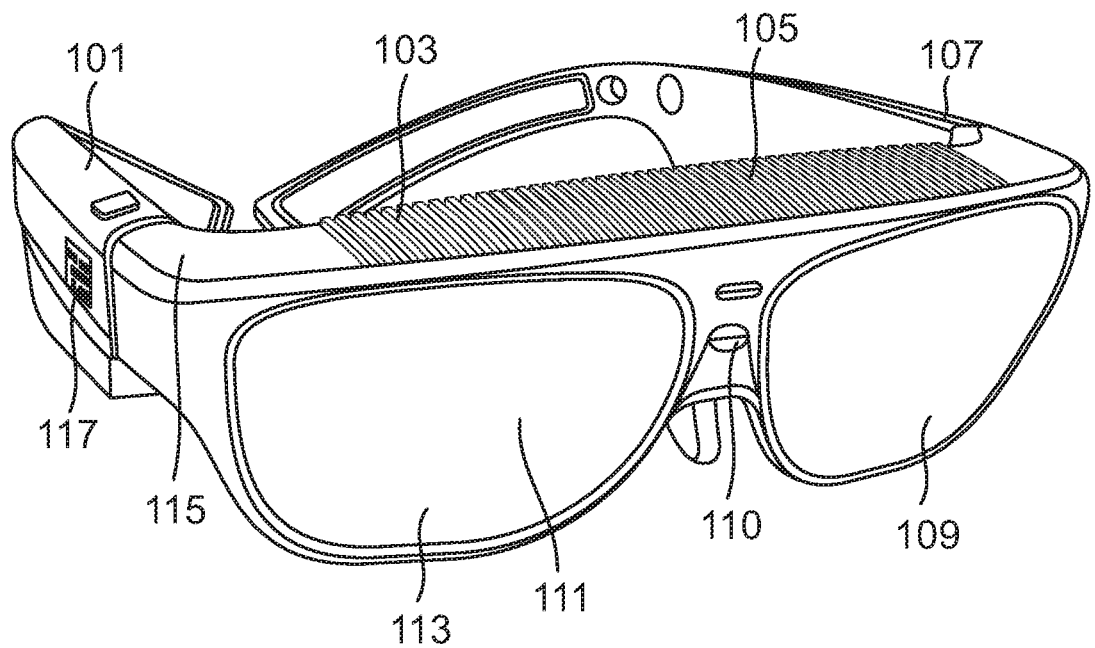
FIG. 11A, depicts schematic versions of prior art and proprietary features sets as embodied in fungible hardware units, as claimed below and as described in the text, with exemplary rather than limiting features emphasized, as would be known to artisans in incorporating inventive kernels of the instant teachings.
Figure 11B:
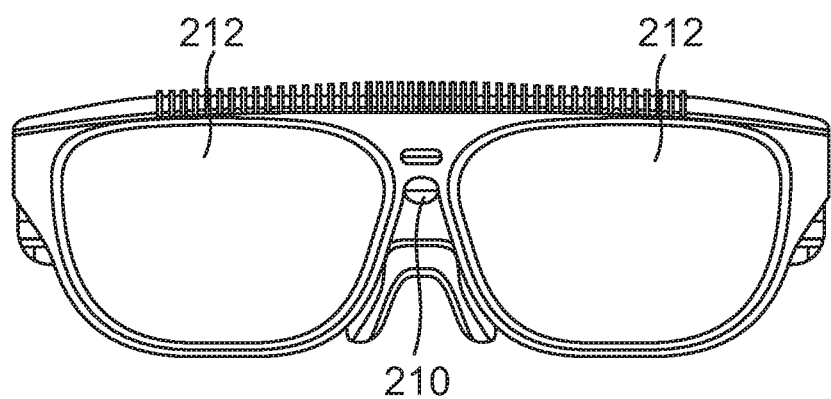
FIG. 11B, depicts schematic versions of prior art and proprietary features sets as embodied in fungible hardware units, as claimed below and as described in the text, with exemplary rather than limiting features emphasized, as would be known to artisans in incorporating inventive kernels of the instant teachings.

Referring now to FIGS. 11A and 11B, any embodiments of the future Eyedaptic AR glasses need to have Power sources (lithium ion batteries 101) either on-board or as part of the frames themselves. Connectivity, by Bluetooth/Wifi 103 is likewise built in along with processor 105 and charging and data port 107. Dual display 109 and autofocus camera 110, along with dual display 111, lens 113, accelerator/gyroscope/magnetometer 115, function via control button 117.

Figure 12:
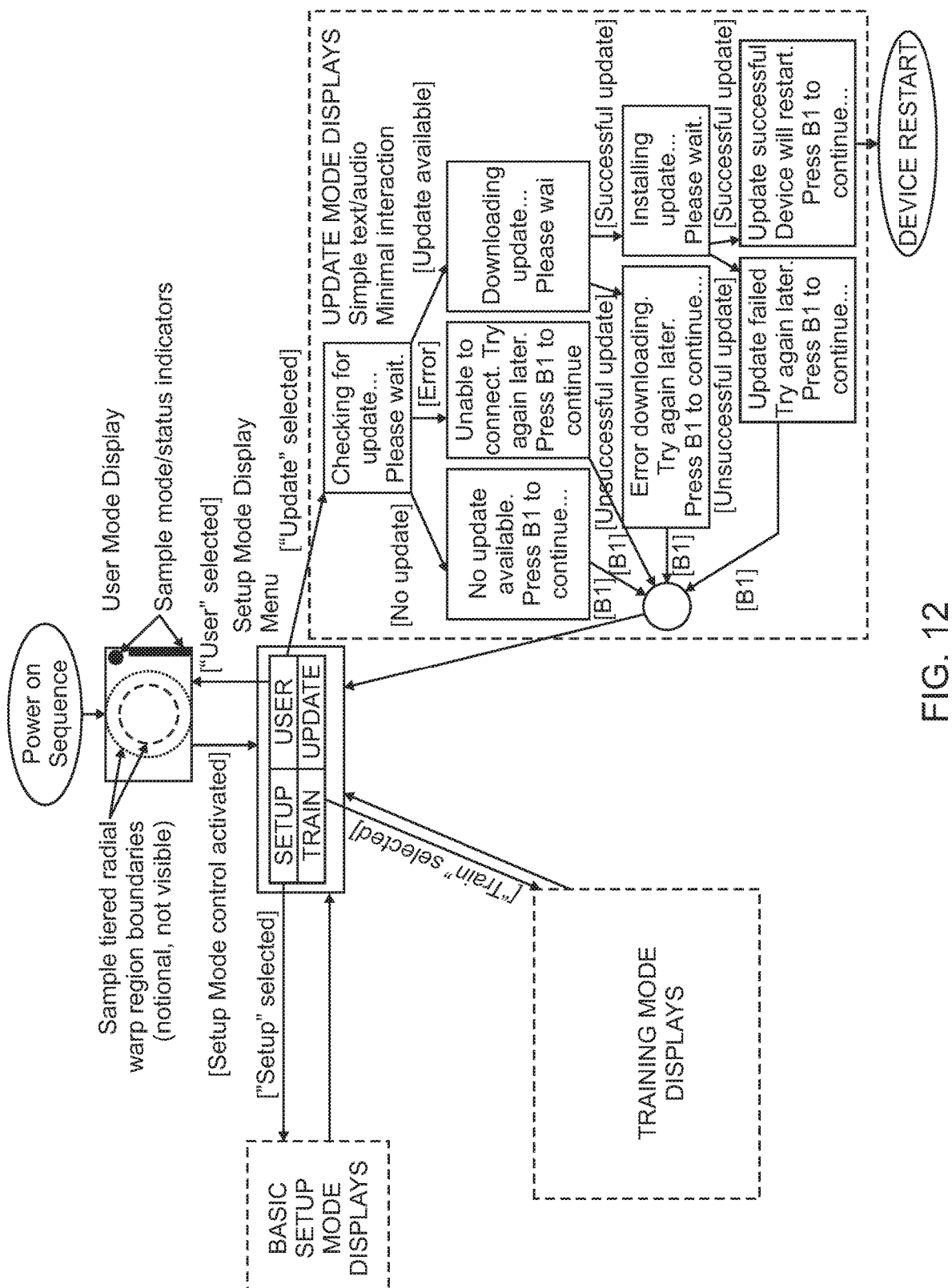
FIG. 12 is a schematic flow chart showing operations of the instant system.
Figure 13:
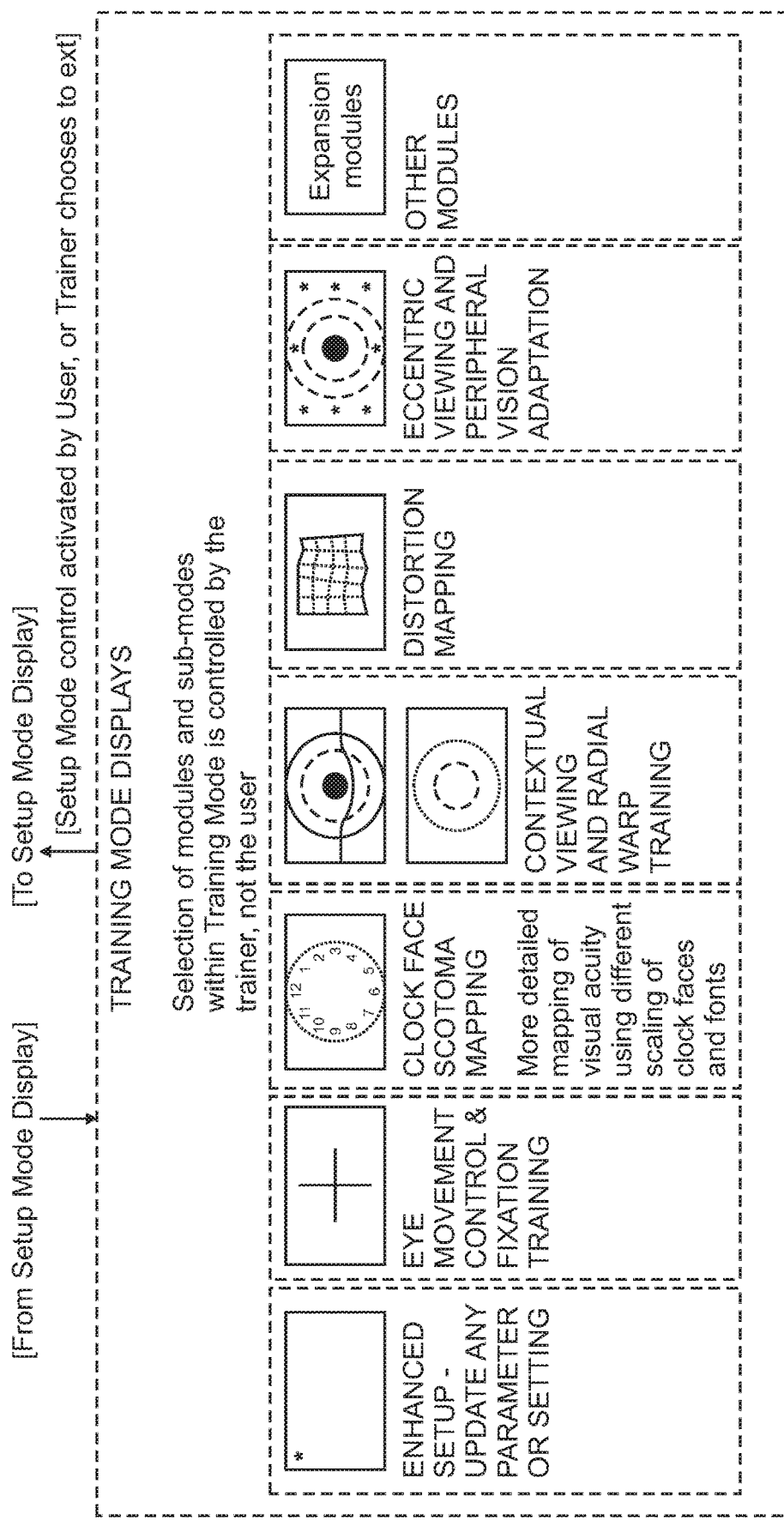
FIG. 13 is a schematic flow chart showing operations of the instant system.
Figure 14:
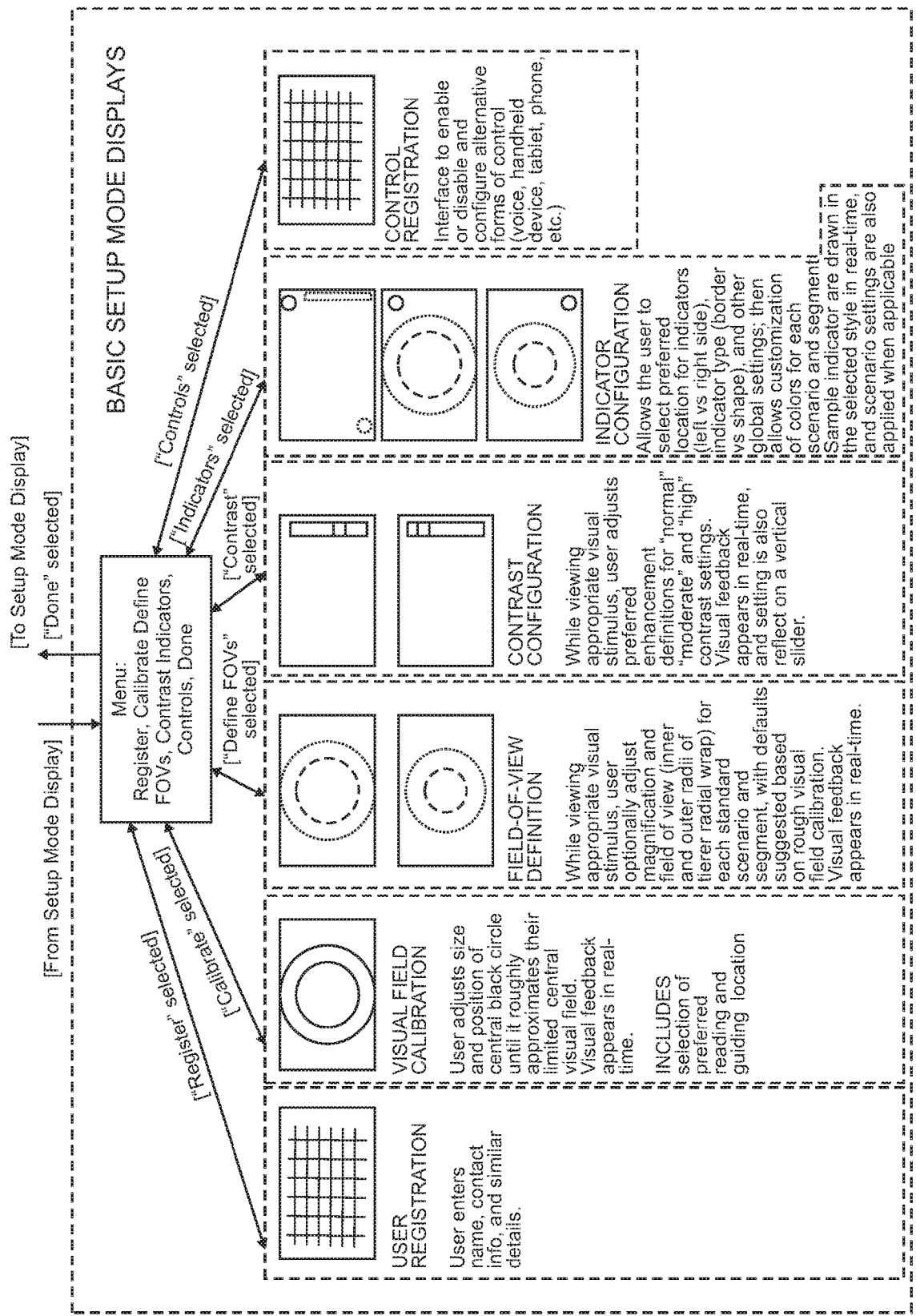
FIG. 14 is a schematic flow chart showing operations of the instant system; Each operational modes and user interfacing according to the teachings of the present invention.

FIG. 11B shows dual stereoscopic see-thru displays 212, and autofocus camera 210. Each of these versions, and the tablet version offer several modes for either the user or trainer. Many of these feature unique constructs and methodologies to address the usage with a variety of retinal diseases such as macular degeneration. These are balanced between control of functions to enable adaptation to the users particular afflictions and progression along with simple and easy to use approach for everyday usage. Referring now also to FIG. 12-FIG. 14, various operations are detailed and explained.

Overview & Modes

The User Interface for the Eyedaptic AR glasses offer several modes for either the user or trainer. Many of these feature unique constructs and methodologies to address the usage with a variety of retinal diseases such as macular degeneration. These are balanced between control of functions to enable adaptation to the users particular afflictions and progression along with simple and easy to use approach for everyday usage in a variety of settings and applications as follows. Referring now to FIG. 12, choices are arrayed as shown. Still referring to FIG. 12, operational sequencing is further demonstrated.

User Mode—the AR visual aid automatically boots into this mode upon power up.

Training Mode—combination of buttons put AR visual aid into a training mode for use by Low Vision Specialists to help the user adapt and customize settings for the user.

Setup Mode—another combination of buttons place the AR visual aid into a set up mode for user of trainer control of the visual field and user controls.

Update Mode—this is a separate mode that will take the user out of user mode, provide software updates and patches and restore user mode to previous settings.

User Mode

For everyday usage by the user there are a limited number of modes and adjustments for simplicity but powerful in their application. These are controlled through a simple set of buttons on the AR device or through simple voice commands, as well as a remote Bluetooth connected handheld device.

Spotting & Reading toggle—this novel user features allows shifting between a mode for distance viewing and finding objects and then zooming in and reading specific text. This includes functionality like auto zoom based on head movements.

Magnification adjust—this adjustment includes the ability to either toggle between present preferred magnification setting as well as a more continual magnification adjustment for on the fly optimization.

FOV adjust—this allows the ability to change the size of the area of interest for magnification as well as amount of warping desired on the fly or simply use settings as indicated in set up mode.

Contrast adjust—this adjustment will help the user optimize the amount of contrast desired for a given application or lighting level. Either rocker button or voice control among other approaches.

Britext toggle—this on or off feature highlights the text being read in a halo in order to improve reading ability and speed.

Reference lines toggle—another on off feature for reading applications, where reference lines are superimposed on the image to guide the user in following text through the nonlinear regions of the display.

Distortion toggle—based upon presets determined through mapping of distortion (as described separately) this on off feature will aid in undistorting an image or text based on the predetermined predistortion matrix.

Training Mode

This mode is targeted for the trainers, usual the Low Vision Specialists or Occupational Therapists who help the user with their low vision training. This offers the initial setup mode available to either the trainer or user, but layers on many novel features. These features are used to both calibrate the user's affliction as well as providing various training aspects for the user to more effectively use the AR visual aid as follows.

Initial setup (see setup mode)—before entering training mode the trainer will enter into setup mode for initial setup of data entry, registration and default user settings.

Clock face scotoma mapping—this module gives the ability to accomplish of rough mapping of the users scotoma in order to better understand their low vision affliction and needs.

Eye movement control & fixation training—a module for guiding the user in a training regime in order to better control eye movement and fixation to optimize usefulness of the augmented reality device.

This will include guidelines and targets to help both the user and trainer. This may also include eye tracking in order for the trainer to better understand the user's particular needs.

Eccentric Viewing & Peripheral Vision Adaptation—further modules are included to guide the trainer and user in order for the user to more effectively and consistently utilize their peripheral vision. This includes more quickly adapting to the most effective eccentric viewing technique and preferred retinal locus.

Contextual Viewing & Inclusion with Hybrid Distortion—in order to better utilize the full FOV of the augmented reality device and take advantage of the nonlinear transformations that maximize the field of vision a training module to help the user adapt to this view is utilized.

Gamification of Training—the above modules can be gamified to help the user practice and improve over time. Many such games can be constructed to help improve fixation, eccentric viewing, contextual viewing and adaptation.

Distortion Mapping—as described later a distortion mapping can be made of the particular user's affliction. In training mode this map can be constructed with help of the trainer/specialists for later use to undistort the user's vision. Referring now also to FIG. 13.

Setup & Update Mode

This mode can be initialized from the user mode, and can be utilized by the user, the trainer, or someone helping the user set up their device. The purpose of this mode is not only to provide an overrides of the user mode for support purposes, but also initial registration and setup. Furthermore, this can provide the ability for ongoing adjustment of the AR visual aid to aid and enhance adaptation, as well as provide an easy path to software updates and patches if desired.

Initial Setup

Magnification area—this defines the size and shape of the area of interest for initial magnification.

Scotoma—this defines the size, shape a placement of the scotoma for later use to construct non linear warping function(s).

Contrast—the amount of initial contrast can be set as well or leave to the automatic contrast adjustment.

Data Entry/Registration & Setup—user date such as name, date, contact info etc. is entered upon setup.

Mode shift indicators toggle—the inclusion of the mode shift indicator can be selected to aid the user in determination of what mode they are using.

Button & Voice mode control toggle—type of user interface can be selected here to take advantage of any voice mode control functions.

One button update software update—this is selected through a particular series of buttons to eject augmented reality visual aid from the user mode into an automatic update mode to accept any software updates or patches. This will include how to connect to internet in order to receive the updates.

Referring now also to FIG. 13 and FIG. 14. The four-control (B1, B2, B3, and touchpad) user interface described above exists to provide a minimum viable control mechanism to all users. Its existence is crucial because the presence of an external controller or online data service connection cannot be guaranteed. Some users will be unable to maintain external hardware reliably without misplacing it; other will lack the dexterity or visual ability to use one. When possible, additional buttons will be provided. Additionally, the Eyedaptic visual aid affords a wide variety of control interfaces for more sophisticated and determined users. These interfaces provide fine-grained access to all features and capabilities, and include voice access for spoken commands and responses, handheld Bluetooth controllers, mobile phone or tablet-based applications, and Wifi-based control by computers or other devices. Any of the remote devices can incorporate virtual graphical user interfaces, command-line or scripted interfaces, physical switches and other physically-manipulated controls, or motion-sensing devices. Supporting Wifi, Bluetooth, and other wireless communication schemes also means that controls can originate at great distances.

Because the device incorporates motion sensors, they are also part of the user interface. Movements can trigger behavior dependent on the scenario. For example, when operating in a sustained scenario for reading or other close-up work, large head motions can be caused to trigger a switch to associated spotting parameters, allowing the user to re-orient his view; once large-scale motions cease, an automatic return to the sustained reading configuration will occur after a suitable programmed delay. As a more complex example, the amount of magnification can be adjusted to be proportional to the amount of head motion. Automatic image stabilization, which depends in part on these embedded motion sensors, can also be associated with a specific subset of scenarios.

With the addition of more interfaces and controls comes even greater flexibility. One important feature that requires more than the minimal user interface is the "floating" scenario. As described above, the touchpad and B2/B3 can be used to fine-tune a scenario. However, such changes are ephemeral, and will be lost as soon as B1 is used to change the scenario. A permanent change to the default settings for a scenario requires returning to Setup Mode. As an expedient alternative, the current configuration can be instantly stored into a designated "floating" scenario via a single button press, voice command, or other well-defined control activation. This allows the user to tailor a custom configuration on-the-fly, creating a corresponding pair of sustained/spotting configurations suited to a specific task without entering Setup Mode. Once created, the floating scenario behaves just like any other scenario except that it retains any changes made to it.

Another advanced feature that needs to be voluntarily activated is "autozoom," or automatic magnification based on text size. In a scenario that is intended to be a reading context (either sustained or spotting), when this feature is activated the images are scanned to look for text or text-like features in the high-acuity portion of the wearer's field of view. A standard Computer Vision/Optical Character Recognition technique such the well-known Stroke Width Transform can be used to locate these features. When detected, the magnification level and/or field-of-view is adjusted to increase small text to the preferred text size for reading. The magnification is never permitted to change too quickly, and is restored to a neutral setting when large head movements are detected. Autozoom can operate fully autonomously, or can be activated in a one-shot fashion by a command.

Setup Mode

This mode can be entered from User Mode, and can be utilized by the user, the trainer, or someone helping the user to configure their device. This mode supports not only initial setup and registration plus later configuration changes to override existing User Mode settings, but also constitutes a prerequisite gateway to the other special-purpose modes, Training Mode and Update Mode, which can only be entered from Setup Mode.

Functions provided here are deliberately limited to avoid confusing the untrained user, but still provide a high degree of utility and customizability. The determined and capable user can perform further customizations by entering Training Mode.

Setup Mode functions are:
- Registration—User data such as name, date, contact information, etc. is entered. This does not typically change after initial setup, but can be updated as desired.
- Rough calibration of visual field—A short device-directed exercise is used to obtain a very rough estimate of the size, shape, and placement of a central scotoma or other visual field defect for later use in automatically adapting the processing to the user's visual characteristics.
- Magnification and FOV—A short device-directed exercise is used to help the user select desired amounts of magnification under conditions simulating typical visual tasks, such as reading or navigating. Field of view is automatically adjusted based on requested magnification, with the exact formula depending on the measured visual field. Preferred text size is also configured here for use with automatic zooming.
- Contrast—A short device-directed exercise assists the user in selecting preferred contrast enhancements under conditions simulating typical visual tasks that often require improved contrast (e.g. reading).
- Mode indicator configuration—Allows the user to override the automatic choices made for indicating mode changes in the display; typically the user will adjust this to obtain mnemonically-useful results, e.g. "red" for "reading."
- Control interface—The user can enable or disable voice control, external controllers, and other control-related options (e.g. to limit the control scheme in User Mode for a low-dexterity user).

For the most part, the basic Setup Mode makes a large number of complex processing decisions based on a small number of interactive user decisions. The result is expected to be satisfactory for a majority of users; those who desire further customization must turn to Training Mode.

Training Mode

This mode is targeted for trainers, usual Low Vision Specialists or Occupational Therapists who help the users with their low vision training. This offers the capabilities of Setup Mode available to either the trainer or user, but layers on many novel features. These features are used to both calibrate the user's affliction as well as providing various training aspects for the user to more effectively use the AR visual aid as follows.

Initial setup (see Setup Mode)—Before entering training mode the trainer will enter into setup mode for initial setup of data entry, registration and default user settings. Clock face scotoma mapping—This module gives the ability to establish a rough map of the users scotoma or visual defect in order to better understand their low vision affliction and needs. The clock face methodology, which presents only the numbers associated with a traditional clock face, is instantly recognizable and relatable to most users. Once a rough mapping of a visual field defect is established based on visibility of numbers at the standard twelve positions on a clock faces of various sizes, those same positions can be used to grade acuity further by varying the brightness or size of the numbers, or using the well-known "oriented-E" technique.

Eye movement control & fixation training—This module guides the user in a training regime in order to better control eye movement and fixation in order to optimize usefulness of the augmented reality device. This includes displayed guide lines and targets to help both the user and trainer. It may also include eye tracking in order for the trainer to better understand the user's particular needs.

Eccentric Viewing & Peripheral Vision Adaptation—Further modules are included to guide the trainer and user in order for the user to more effectively and consistently utilize their peripheral vision. This includes more quickly adapting to the most effective eccentric viewing technique and preferred retinal locus.

Contextual Viewing & Inclusion with Hybrid Distortion—In order to better utilize the full FOV of the augmented reality device and take advantage of the nonlinear transformations that maximize the field of vision, this training module to help the user understand and adapt to this view is utilized.

Gamification of Training—The above modules can be gamified to help the user practice and improve over time. Many such games can be constructed to help improve fixation, eccentric viewing, contextual viewing and adaptation.

Distortion Mapping—As described elsewhere, when distortion is present in a user's field of view, a mapping can be interactively fashioned to reflect the details of this distortion. In training mode this map can be constructed with help of the trainer/specialists for later use to undistort the user's vision.

Training Mode also functions as a greatly-enhanced Setup Mode, providing a trained facilitator with a number of graphical user interface tools for tailoring the device to a specific user's requirements. Whereas the standard Setup Mode provides a low-complexity route to semi-custom settings suitable for a class of users who make the same choices in Setup Mode, Training Mode allows for detailed customization to the specific user.

For example, the facilitator can narrow down the wide array of possible parameter combinations presented by the device by choosing from a set of tool palettes that contain archetypical configurations for various conditions, e.g. Age-related Macular Degeneration, Retinitis Pigmentosa, etc. This initial choice subsequently determines the baseline scenarios selected for User Mode. Additional adjustments made during Training mode can automatically fine-tune these for the user. The initial choice also restricts the suggested processing options to help the trainer test and evaluate their utility for the specific user, but the facilitator always has the option of incorporating any feature combination into a user's configuration.

Update Mode

When update mode is entered from Setup Mode, the operator can initiate a request to check for available software updates or patches. The device will attempt to satisfy this request by connecting to a remote server via an available wireless or tethered interface. If the device is not up-to-date, the user will be asked to confirm a desire to perform the update. Once confirmed, the update will occur automatically.

Interrupted updates that are recoverable (e.g. due to loss of connection) will prompt the operator for a decision about continuing or returning to Setup Mode. Unrecoverable interruptions (e.g. loss of power) will require a restart into User Mode, and will be accompanied by a warning message.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Reference throughout this specification to "one embodiment," "an embodiment," or similar language mans that a particular feature, structure, or characteristic described in connection with the embodiment is included in at least one embodiment of the present invention. Thus, appearances of the phrases "in one embodiment," "in an embodiment," and similar throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention, are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

A processor may be provided by one or more processors including, for example, one or more of a single core or multi-core processor (e.g., AMD Phenom II X2, Intel Core Duo, AMD Phenom II X4, Intel Core i5, Intel Core I & Extreme Edition 980X, or Intel Xeon E7-2820).

An I/O mechanism may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (MC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof.

Memory according to the invention refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Memory may be, for example, one or more of a hard disk drive, solid state drive (SSD), an optical disc, flash memory, zip disk, tape drive, "cloud" storage location, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method of modeling a focus of attention of a user with a head-mounted visual aid device, comprising the steps of:
   capturing real-time video images with a camera of the head-mounted visual aid device;
   applying a magnification coefficient to the real-time video images;
   sensing at least one movement parameter of the head-mounted visual aid device over a first time period with at least one sensor of the head-mounted visual aid device;
   analyzing in a processor of the head-mounted visual aid device the at least one movement parameter and the magnification coefficient over the first time period to determine a focus of attention state of user; and
   updating a focus of attention model of the user with the focus of attention state.

2. The method of claim 1, wherein the focus of attention state indicates that the user is engaged in deliberate movements.

3. The method of claim 2, further comprising updating the focus of attention model such that a focus of attention (FOA) of the user matches a camera axis of the camera.

4. The method of claim 2, wherein the deliberate movements are consistent with a panning movement of the user.

5. The method of claim 2, wherein the deliberate movements are consistent with a reading movement of the user.

6. The method of claim 1, wherein the focus of attention state indicates that the user is engaged in inadvertent movements.

7. The method of claim 6, further comprising activating electronic image stabilization in the head-mounted visual aid device to apply electronic image stabilization to the real-time video images.

8. The method of claim 6, further comprising updating the focus of attention model such that a focus of attention (FOA) of the user comprises a desired gaze direction different than a camera axis of the camera.

9. The method of claim 1, wherein the at least one movement parameter comprises an acceleration of the head-mounted visual aid device.

10. The method of claim 1, wherein the at least one movement parameter comprises a rotation of the head-mounted visual aid device.

11. The method of claim 1, wherein the first time period does not exceed a video frame time of the camera.

12. A method of modeling a focus of attention of a user with a head-mounted visual aid device, comprising the steps of:
   capturing real-time video images with a camera of the head-mounted visual aid device;
   sensing at least one movement parameter of the head-mounted visual aid device over a first time period with at least one sensor of the head-mounted visual aid device;
   analyzing in a processor of the head-mounted visual aid device the at least one movement parameter over the first time period to determine a focus of attention state of user, wherein the focus of attention state of the user indicates that the user is engaged in deliberate movements; and
   updating a focus of attention model of the user with the focus of attention state such that a focus of attention (FOA) of the user matches a camera axis of the camera.

13. The method of claim 12, wherein the deliberate movements are consistent with a panning movement of the user.

14. The method of claim 12, wherein the deliberate movements are consistent with a reading movement of the user.

15. A method of modeling a focus of attention of a user with a head-mounted visual aid device, comprising the steps of:
   capturing real-time video images with a camera of the head-mounted visual aid device;
   sensing at least one movement parameter of the head-mounted visual aid device over a first time period with at least one sensor of the head-mounted visual aid device;
   analyzing in a processor of the head-mounted visual aid device the at least one movement parameter over the first time period to determine a focus of attention state of user, wherein the focus of attention state of the user indicates that the user is engaged in inadvertent movements;
   updating a focus of attention model of the user with the focus of attention state; and
   activating electronic image stabilization in the head-mounted visual aid device to apply electronic image stabilization to the real-time video images.

16. The method of claim 15, further comprising updating the focus of attention model such that a focus of attention (FOA) of the user comprises a desired gaze direction different than a camera axis of the camera.

17. A method of modeling a focus of attention of a user with a head-mounted visual aid device, comprising the steps of:
   capturing real-time video images with a camera of the head-mounted visual aid device;
   sensing at least one movement parameter of the head-mounted visual aid device over a first time period with at least one sensor of the head-mounted visual aid device;
   analyzing in a processor of the head-mounted visual aid device the at least one movement parameter over the first time period to determine a focus of attention state of user, wherein the focus of attention state of the user indicates that the user is engaged in inadvertent movements;
   updating a focus of attention model of the user with the focus of attention state such that a focus of attention (FOA) of the user comprises a desired gaze direction different than a camera axis of the camera.

18. A method of modeling a focus of attention of a user with a head-mounted visual aid device, comprising the steps of:
   capturing real-time video images with a camera of the head-mounted visual aid device;
   sensing at least one movement parameter of the head-mounted visual aid device over a first time period with at least one sensor of the head-mounted visual aid device, wherein the first time period does not exceed a video frame time of the camera;
   analyzing in a processor of the head-mounted visual aid device the at least one movement parameter over the first time period to determine a focus of attention state of user; and
   updating a focus of attention model of the user with the focus of attention state.

* * * * *